(12) United States Patent
Wolcott et al.

(10) Patent No.: US 10,805,817 B2
(45) Date of Patent: Oct. 13, 2020

(54) NEAR-FIELD COMMUNICATION OVER SERVICE NETWORKS

(71) Applicant: Comcast Cable Communications, LLC, Philadelphia, PA (US)

(72) Inventors: Larry Wolcott, Denver, CO (US); Andy Martushev, Castle Rock, CO (US); Anthony Werner, Castle Rock, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/820,877

(22) Filed: Nov. 22, 2017

(65) Prior Publication Data

US 2019/0159052 A1    May 23, 2019

(51) Int. Cl.
| H04W 64/00 | (2009.01) |
| H04W 24/10 | (2009.01) |
| H04W 4/80 | (2018.01) |
| H04B 3/46 | (2015.01) |
| H04M 1/725 | (2006.01) |
| H04Q 1/24 | (2006.01) |
| H04W 4/02 | (2018.01) |

(52) U.S. Cl.
CPC .............. *H04W 24/10* (2013.01); *H04B 3/46* (2013.01); *H04M 1/7253* (2013.01); *H04Q 1/24* (2013.01); *H04W 4/80* (2018.02); *H04W 64/003* (2013.01); *H04W 64/006* (2013.01); *H04W 4/02* (2013.01); *H04W 4/027* (2013.01)

(58) Field of Classification Search
CPC ......... H04W 4/80; H04B 3/46; H04M 1/7253
See application file for complete search history.

(56) References Cited

U.S. PATENT DOCUMENTS

| 6,281,690 | B1 | 8/2001 | Frey |
| 8,498,572 | B1* | 7/2013 | Schooley ............. H04B 5/0031 455/41.1 |
| 2009/0097855 | A1* | 4/2009 | Thelen ............. H04B 10/25752 398/115 |
| 2009/0157512 | A1* | 6/2009 | King ...................... G06Q 10/10 705/14.27 |
| 2012/0220240 | A1* | 8/2012 | Rothschild ............ H04W 24/08 455/67.11 |
| 2012/0322411 | A1* | 12/2012 | Lazarev ................ H04W 12/06 455/411 |
| 2013/0110466 | A1* | 5/2013 | Zimmerman ...... G01R 29/0835 702/189 |

(Continued)

OTHER PUBLICATIONS

User's Guide Wire Tracer Kit: Model TG30, 2002, Extech Instruments Corporation, V1.3.

*Primary Examiner* — Asghar H Bilgrami
(74) *Attorney, Agent, or Firm* — Banner & Witcoff, Ltd.

(57) ABSTRACT

Methods, systems, and apparatuses for performing Near-field communication (NFC) over a network are presented. In an implementation, a computing device may send to a mobile device a cellular signal that carries information for a NFC signal communication through a communication link, such as a cable. The computing device may determine that an NFC signal propagated from the mobile device has traversed or has been received over the communication link. The computing device may indicate receipt of the NFC signal, or initiate other actions.

30 Claims, 23 Drawing Sheets

(56) References Cited

U.S. PATENT DOCUMENTS

| | | | | |
|---|---|---|---|---|
| 2013/0128753 | A1* | 5/2013 | Gallagher | H04W 40/12 370/252 |
| 2013/0291044 | A1* | 10/2013 | Zinevich | H04N 21/44209 725/111 |
| 2014/0066098 | A1* | 3/2014 | Stern | H04W 4/043 455/456.3 |
| 2014/0129006 | A1* | 5/2014 | Chen | G05B 15/02 700/90 |
| 2014/0180581 | A1* | 6/2014 | Berlin | G06F 17/40 701/491 |
| 2014/0265998 | A1* | 9/2014 | Nielson | H02J 7/0047 320/101 |
| 2015/0142514 | A1* | 5/2015 | Tutte | G06Q 30/0269 705/7.31 |
| 2015/0228419 | A1* | 8/2015 | Fadell | G08B 17/00 307/112 |
| 2015/0278803 | A1* | 10/2015 | Champaneria | G06Q 20/36 705/17 |
| 2015/0355279 | A1* | 12/2015 | Rogel-Favila | G01R 31/2893 324/750.25 |
| 2016/0057595 | A1* | 2/2016 | Ahmed | H04W 4/02 455/404.1 |
| 2016/0183351 | A1* | 6/2016 | Snyder | H04L 12/10 315/152 |
| 2016/0359325 | A1* | 12/2016 | Kawata | G16H 40/67 |
| 2017/0108236 | A1* | 4/2017 | Guan | G05B 19/04 |
| 2017/0141845 | A1* | 5/2017 | Totten | H04N 21/6118 |

* cited by examiner

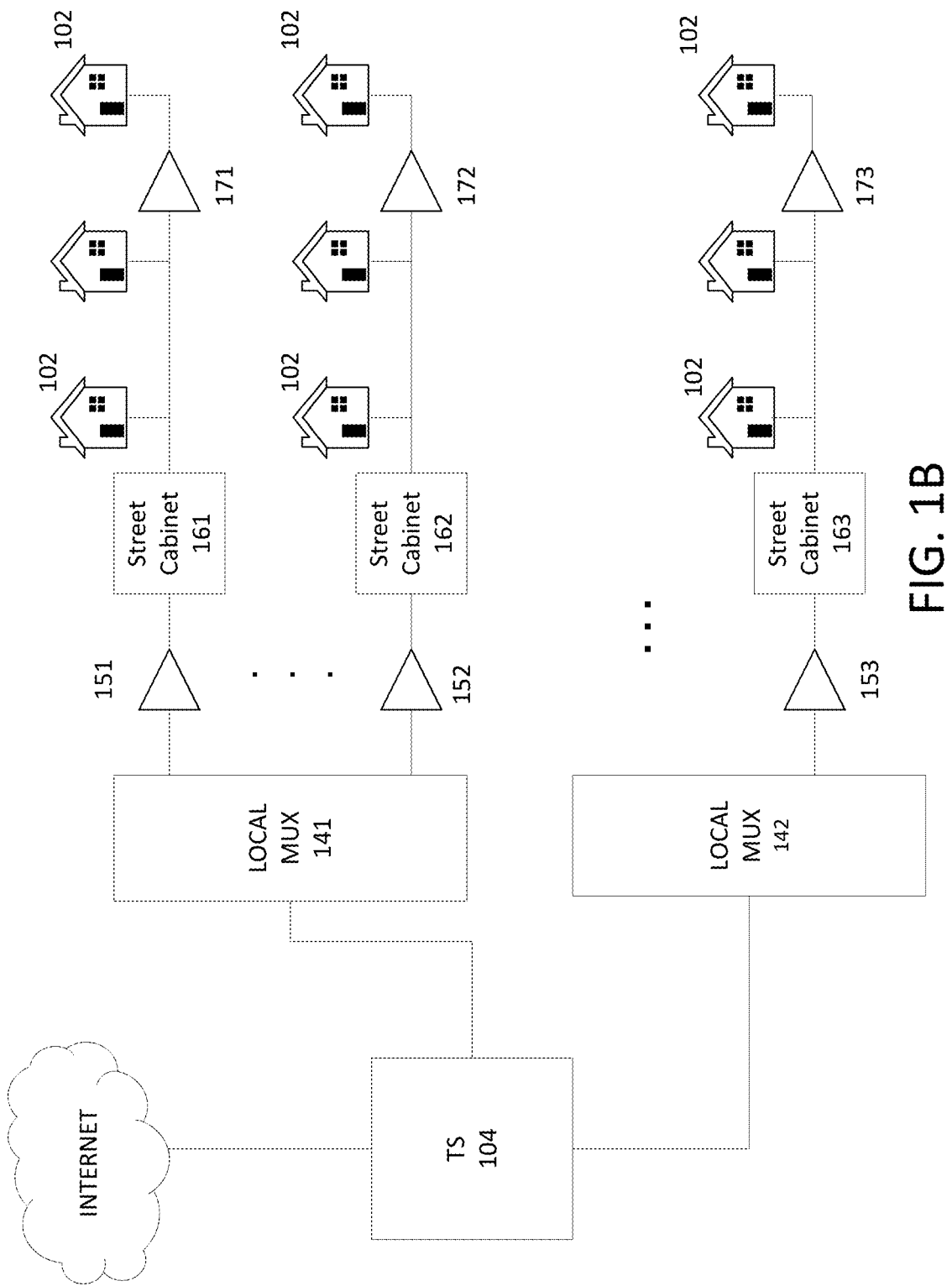

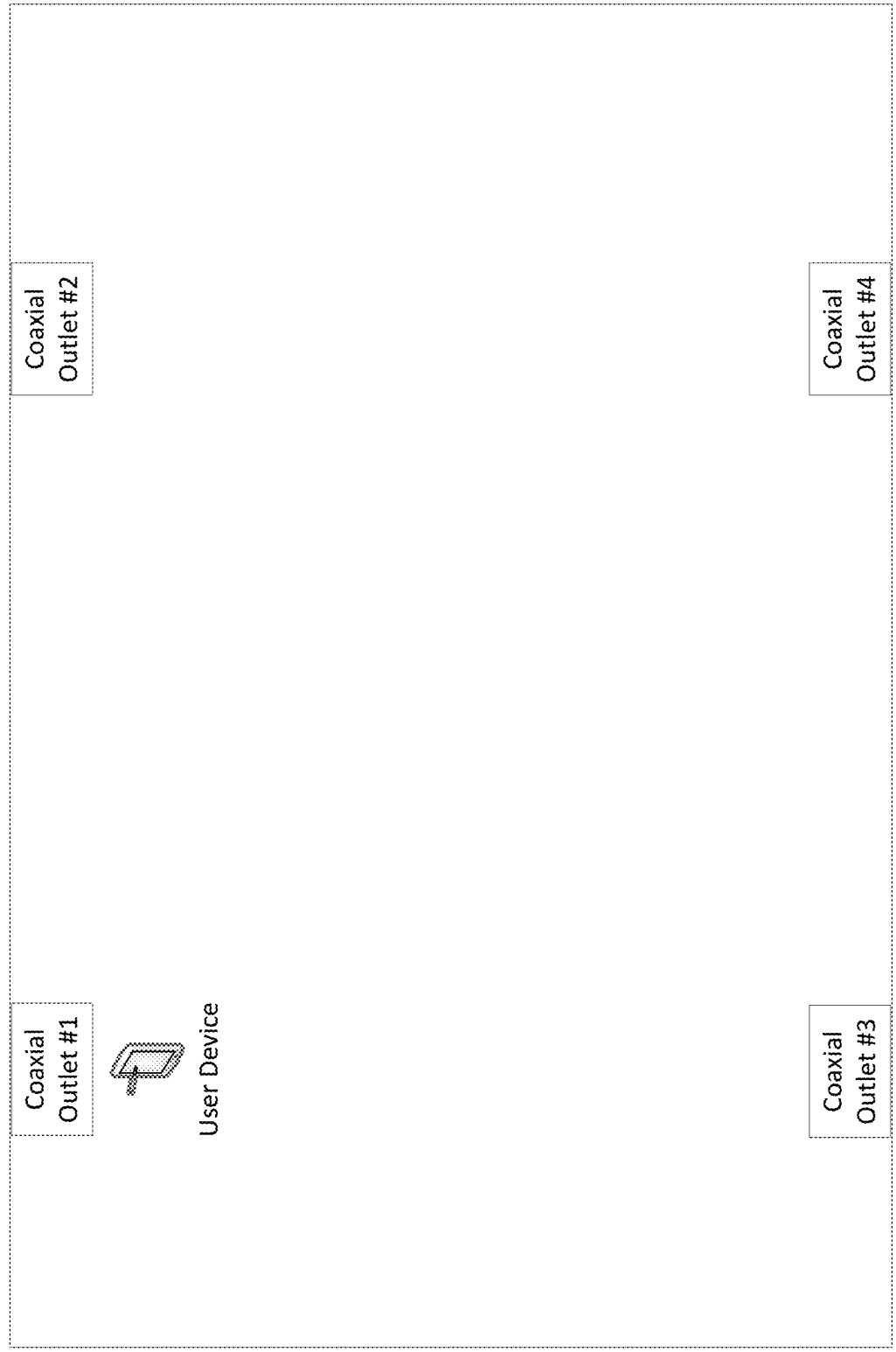

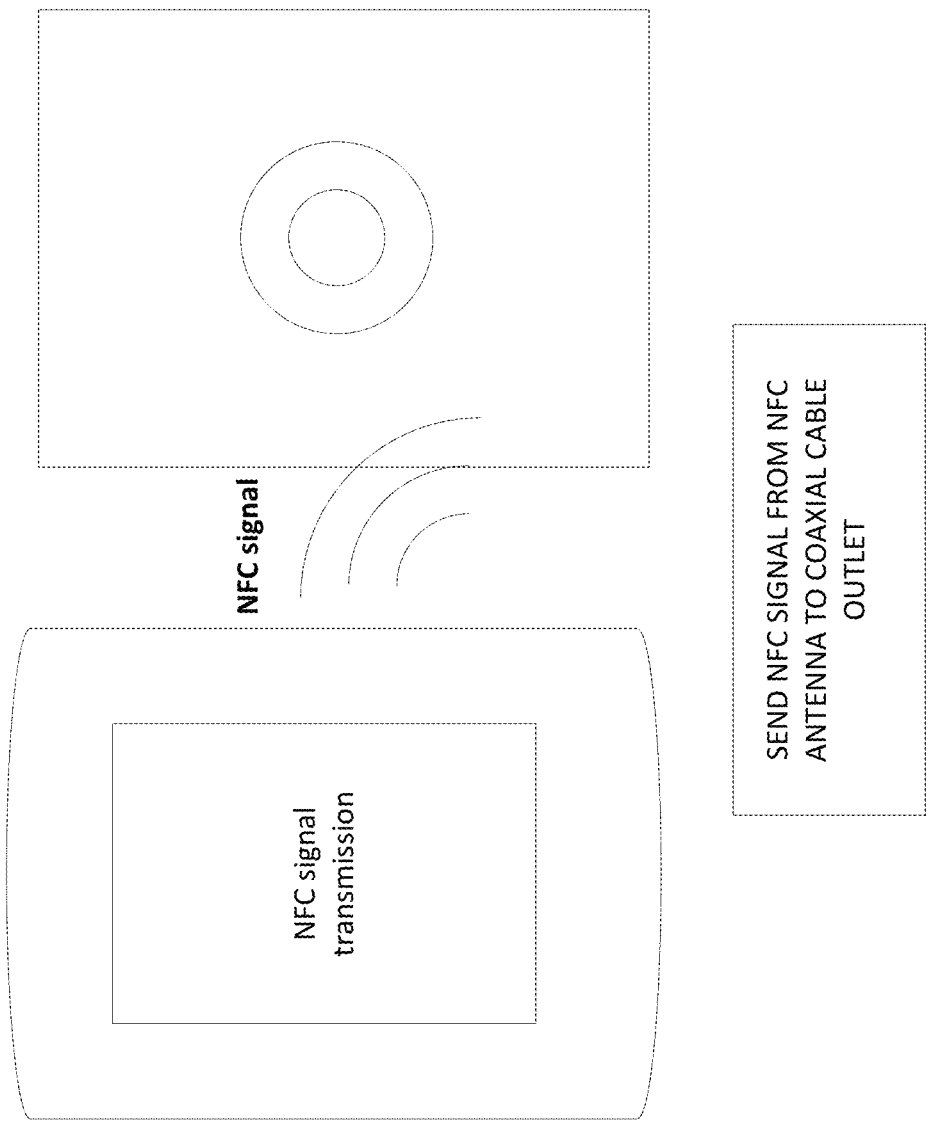

NEAR-FIELD COMMUNICATION OVER SERVICE NETWORKS

BACKGROUND

Network service providers provide telecommunication services, e.g., internet connection and multimedia data service, for a massive number of users via a network that may include wireless and wired communication links. Network service providers typically send technicians to set up service or diagnose problems associated with the service, which is very costly.

Further, some network operators and/or service providers provide self-installation kits if users choose a self-installation option for setting up a TV or video service connection, a high-speed internet connection, etc. The network service providers ship set-top boxes, cable modems, wireless routers, or the like to the users for the self-installation process. However, many of the users do not have technical expertise or network diagnostic equipment, thereby failing to install the received devices. Even a technician having network diagnostic equipment may have some difficulties or may perform inefficient diagnosis in determining whether a particular coaxial cable outlet is connected or not. As a result, technicians spend several hours in processing a set-up request from one user, and users often have to wait to establish a connection after experiencing problems, moving into a new house, etc. Thus, there remains an ever-present need for more efficient ways to determine and test the connectivity of communication links in a service provider's network.

SUMMARY

The following summary is for illustrative purposes only, and is not intended to limit or constrain the detailed description.

As described herein, a system may allow a user to use a device having Near-Field Communications (NFC) capability, such as their cell phone, to test and report on the state and quality related to connectivity of a communication link (e.g., cable wiring) to and in their own home. For example, a customer may initiate an application on their NFC-equipped cell phone, and then may be prompted to position their phone next to a coaxial outlet for testing. An NFC signal may be sent by the phone, received at the coaxial outlet, and passed on (via the in-home coaxial wiring, for example) to an NFC receiver that may be, for example, a part of the user's digital video recorder (DVR) or cable modem. That NFC signal may then be processed to determine the quality of the coaxial wiring between the NFC receiver and the coaxial outlet. The NFC receiver may also be located further upstream in a network, such as at a local office or termination system, such as a Cable Modem Termination System (CMTS) in hybrid fiber coaxial (NFC) network, and one or more intermediate NFC amplifiers may be used to carry the NFC signals.

The system may also transmit the NFC signals in the other direction. For example, the NFC receiver may include an NFC transmitter, and may transmit an NFC signal onto the coaxial wiring. The NFC signal may then be emitted from one or more coaxial outlets in the home, and the user may be prompted to place their cell phone near an outlet to detect the NFC signal. The cell phone may then report the NFC signal that it received, and that report may be used to evaluate the quality of the coaxial wiring.

A system controller may communicate with the cell phone application, and may coordinate the transmission of NFC signals and direct the user's placement of the cell phone. For example, the system controller may be provided with information identifying the coaxial wiring layout and outlets at the user's premises, and may prompt the user to sequentially move from one outlet to the next, placing the phone near each outlet, and the system controller may evaluate the NFC signal received at (or transmitted from) each outlet. By testing the various outlets, the system controller may help to isolate wiring problems in a user's home.

The NFC communication over a network may be performed for various purposes. For example, the procedure may be performed to test connectivity of a coaxial node or to perform a secured transaction (e.g., an online banking transaction, a passcode transmission, etc.), a video game, or the like using an NFC communication via a coaxial cable network. For example, a customer may contact their network provider because the customer is having problems with a signal reception or a signal transmission. The provider may ask the customer to place an NFC-equipped cell phone near a coaxial cable outlet, and the system of the provider may send or receive an NFC signal to/from the cell phone, and use this NFC signal to help diagnose a potential problem. For example, it may be determined that the NFC signal is received very strongly at every coaxial cable outlet in the house, except for one in the basement. The network provider may use this information to help determine whether (and how) the customer's in-home wiring needs to be serviced.

The summary here is not an exhaustive listing of the novel features described herein, and is not limiting of any claims. These and other features are described in greater detail below.

BRIEF DESCRIPTION OF THE DRAWINGS

The present disclosure is described by way of example and not limited in the accompanying figures in which like reference numerals indicate similar elements and in which:

FIG. 1B shows an example hybrid fiber-coaxial (HFC) communication network on which various features described herein may be used.

FIG. 7A through FIG. 7C show an example of testing a coaxial cable outlet using an NFC transmission over a coaxial cable line in an NFC transmit mode that can be used to implement any of the various features described herein.

FIGS. 8B and 8C show an example of testing a coaxial cable outlet using an NFC transmission over a coaxial cable line in an NFC transmit mode that can be used to implement any of the various features described herein.

DETAILED DESCRIPTION

In the following description of various examples, reference is made to the accompanying drawings identified above, which form a part hereof, and in which is shown by way of describing various examples in which aspects of the disclosure may be practiced. Other implementations may be utilized and structural and functional modifications may be made, without departing from the scope discussed herein. Various aspects are capable of other implementations and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Communication Network Architecture

Figure 1A:
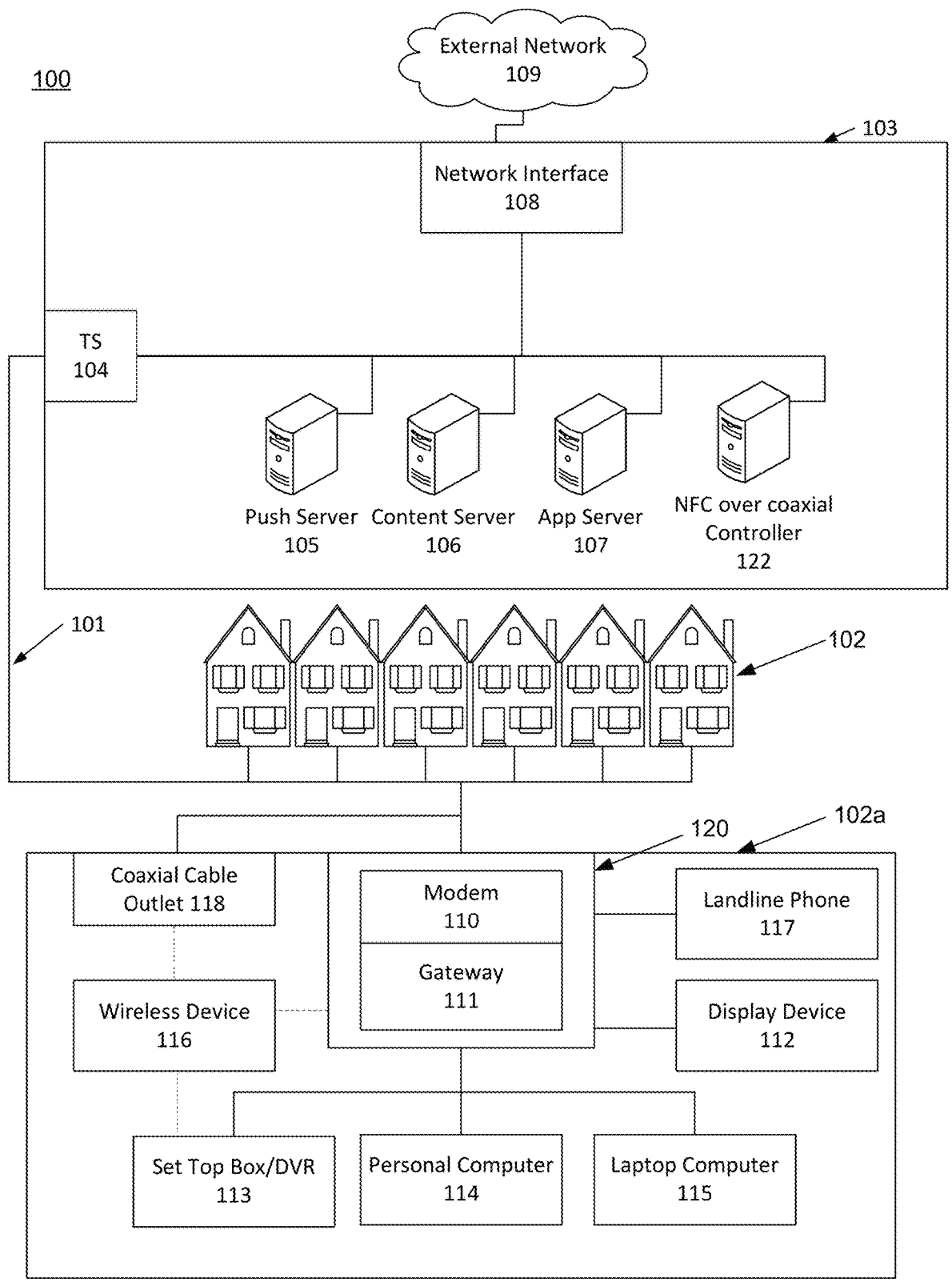
FIG. 1A shows an example communication network on which various features described herein may be used.

FIG. 1A shows an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

The local office 103 may also include one or more Near-Field Communication (NFC) over coaxial communication (NoC) controller 122. The NoC controller 122 controls an NFC signal communication over the coaxial cable line in the links 101. Although shown separately, the NoC controller 122 may be combined with one or more of the push server 105, the content server 106, and the application server 107. Further, the NoC controller 122 may be placed outside of the local office 103, and may communicate with the wireless devices 116 through a mobile communication network, or other types of communication network. More details about the NoC controller 122 will be described below.

NFC is one type of short-range wireless communication protocol that enables two electronic devices to establish a communication link by locating them within about 4 cm of each other. In general, NFC employs electromagnetic induction between two loop antennas to exchange information. NFC devices use a globally available unlicensed radio frequency band, which is the industrial, scientific, and medical (ISM) band of 13.56 MHz on ISO/IEC 18000-3 air interface. In the radio frequency band for NFC communication, most of the RF energy is concentrated in 14 KHz band.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), wireless laptops, notebooks, tablets and netbooks, cordless phones (e.g., Digital Enhanced Cordless Telephone—DECT phones), mobile phones, mobile televisions, personal digital assistants (PDA), etc.), any other desired devices, and combinations thereof. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others. The modem 110 may include an NFC transceiver or an NFC antenna to communicate with an NFC device and may be connected to the coaxial cable outlet 118. More details about the modem 110 will be described below.

The wireless devices 116 include one or more wireless communication interfaces and protocols. For example, the wireless devices 116 may be cellular mobile devices that include a cellular communication interface, such as 2G/3G/4G Long-Term Evolution (LTE)/LTE-Advanced communication interface. The wireless devices 116 can communicate with one or more base stations, relays, access points, or the like by using cellular communication protocols and communication resources assigned by one or more base stations. The communication range of a cellular communication ("cellular communication range") may vary according to different protocols and environment. For example, each cell site operated by a base station may have a range of up to approximately 0.5 mile, while in rural areas, the range could be as much as 5 miles. In clear open areas, a cellular mobile device may receive signals from a base station 25 miles away.

The wireless devices 116 may include other types of wireless communication protocols. For example, the wireless devices 116 may be equipped with one or more short-range wireless communication modules, such as Wi-Fi, Bluetooth, NFC, Infrared communication modules. The wireless devices 116 may include mobile phones equipped with an NFC transmitter, an NFC receiver, or both the NFC transmitter and the NFC receiver (e.g., an NFC transceiver). The wireless devices 116 may also be equipped with Global Positioning System (GPS) modules.

FIG. 1B shows an example hybrid fiber-coaxial (HFC) communication network on which various features described herein may be used. The TS 104, which may be the TS 104 shown in FIG. 1A, is connected between a network (e.g., the Internet) and one or more local multiplexer (MUX) 141. The TS 104 may include a system or a computing device (e.g., the NoC controller 122) that controls the NFC over coaxial communication. Each of the local mux 141 and 142 has a plurality of coaxial cable connection lines to street cabinets, e.g., the street cabinets 161, 162, and 163. Between a local mux and street cabinet, one or more coaxial network components 151, 152, and 153 may be included. For example, the coaxial network components 151, 152, and 153 may include one or more of a signal amplifier, a splitter, a filter, a tap, a directional coupler, a power inserter, etc. Further, between a street cabinet and the premises 102, one or more coaxial network components 171, 172, and 173 may be included. For example, the coaxial network components 171, 172, and 173 may include one or more of a signal amplifier, a splitter, a filter, a tap, a directional coupler, a power inserter, etc.

An NFC transmitter and/or an NFC receiver may be included in one or more of the TS 104, the local mux 141 and 142, the street cabinet 161, 162, and 163, or the coaxial network components 151, 152, 153, 171, 172, and 173. The NFC receiver may be an active NFC receiver powered by a power source (e.g., a battery). Alternatively, or additionally, the NFC receiver may be a passive NFC antenna or tag that does not have an independent power supply. However, the passive NFC antenna or tag can receive an NFC signal propagated via a network communication link (e.g., a coaxial cable line) and be energized and activated by the received NFC signal (via e.g., the electromagnetic induction). When a device includes both the NFC transmitter and the NFC receiver, an NFC transceiver may be included or two separate NFC transmitter and NFC receiver circuits may be included.

Figure 2:
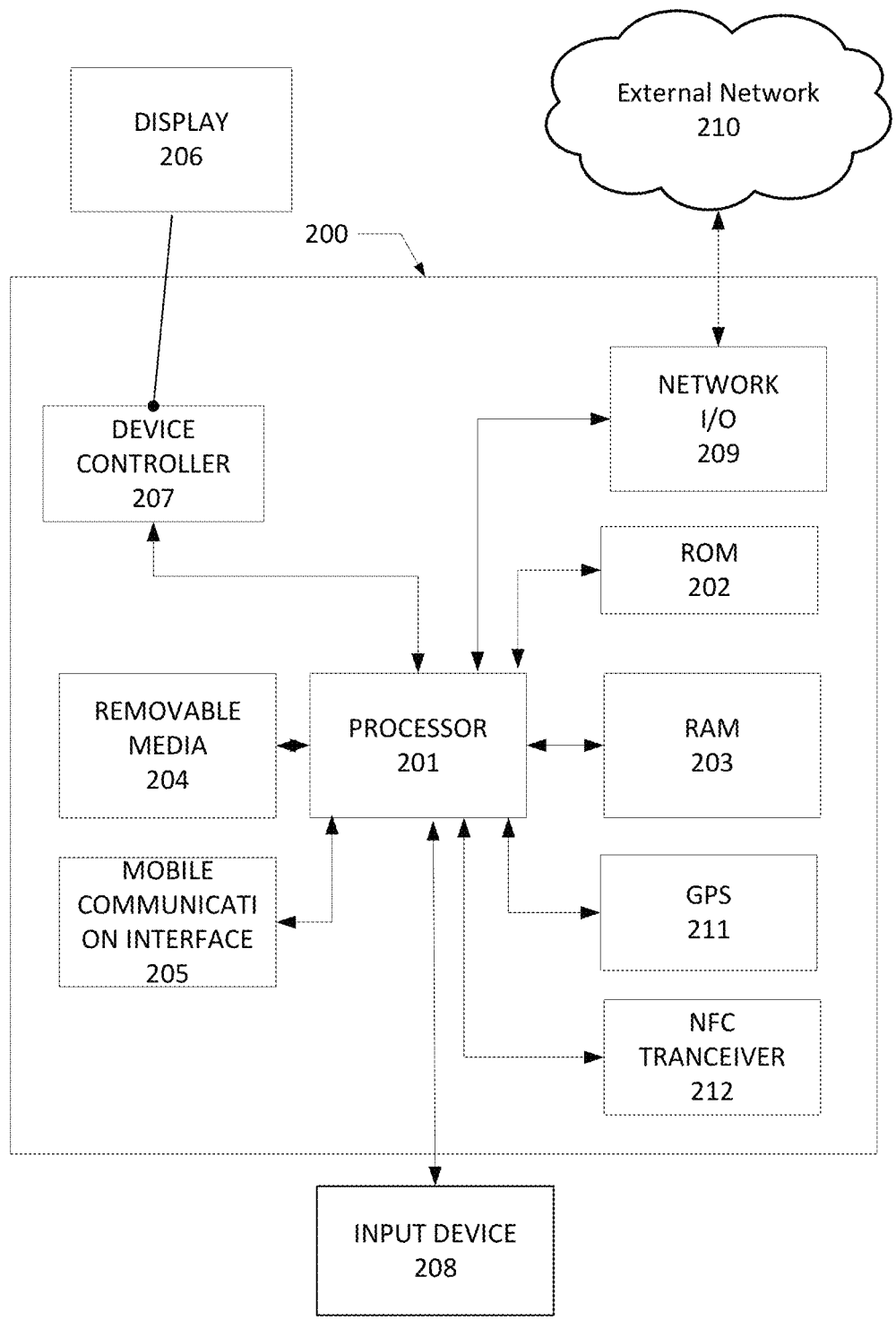
FIG. 2 shows an example computing device that can be used to implement any of the methods, servers, entities, and computing devices described herein.

FIG. 2 shows hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive (not shown). The computing device 200 may include one or more output devices, such as a display 206 (e.g., an external television, a mobile phone display), and may include one or more output device controllers 207, such as a video processor. There may also be one or more user input devices 208, such as a remote control, keyboard, mouse, touch screen, microphone, an input receiver for a wearable device, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Further, the device may include a location-detecting device, such as a global positioning system (GPS) microprocessor 211, which can be configured to receive and process global positioning signals and determine, with possible assistance from an external server and antenna, a geographic position of the device. Further, the computing device 200 may be a mobile device, such as a cell phone or a test device, for example, that includes a mobile communication interface (e.g., a cellular communication modem) that provides a cellular communication link with a base station. The computing device 200 may be the NoC controller 122 or other elements in the hybrid fiber/coaxial cable network.

The computing device 200 may also include an NFC transceiver 212 that transmits or receives an NFC signal. The computing device 200 may not have an NFC transmission capability while having an NFC signal reception capability (or vice versa).

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various implementations. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

NFC Over Communication Link Control Architecture and Features

Diagnosing wiring problems in various types of premises (e.g., a house) is difficult for many ordinary homeowners. Many homeowners do not have network-diagnosing equipment and do not have enough knowledge about the network technology. Even cable network technicians may spend significant amount of time in diagnosing the in-home wiring network. In the present disclosure, a method applies NFC communication functionalities and cellular communication functionalities of a mobile device in association with a local NFC component to simplify diagnosing the condition of an in-home wiring network. The method can be applicable to any type of premises other than a home of a mobile terminal user. One or more examples described herein provides a method, an apparatus, and a system for testing connectivity of a network communication link (e.g., a coaxial cable line) by using an NFC communication via the network communication link. A cellular mobile device having NFC communication functionalities may communicate with a local NFC module in a network via a network communication link (e.g., a coaxial cable line) between the cellular mobile device and the local NFC module to simplify the diagnosis of the in-home wiring network.

Figure 3A:
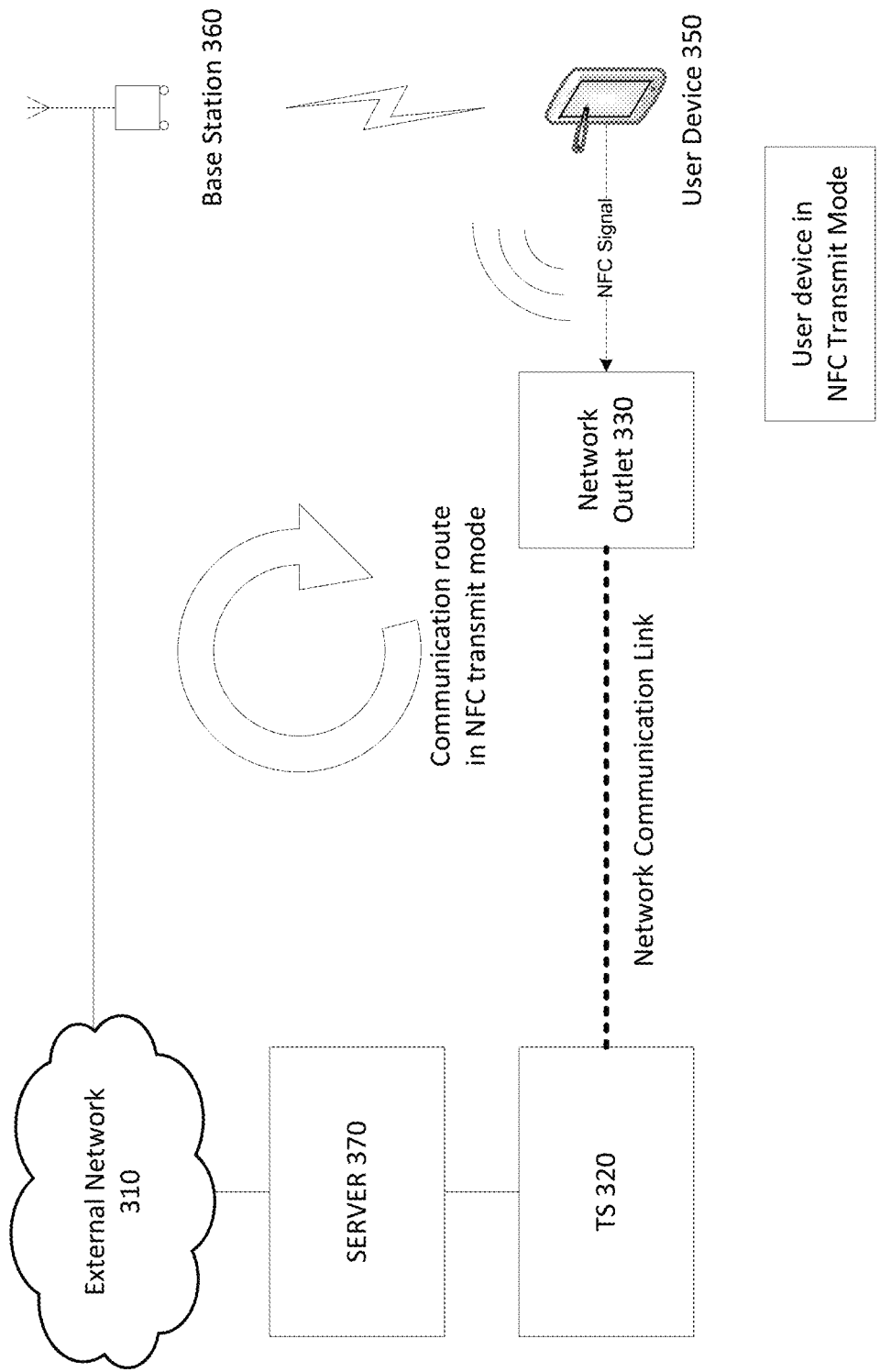
FIG. 3A shows an example diagram for performing an NFC transmission through a network outlet in an NFC transmit mode that can be used to implement any of the various features described herein.
Figure 3B:
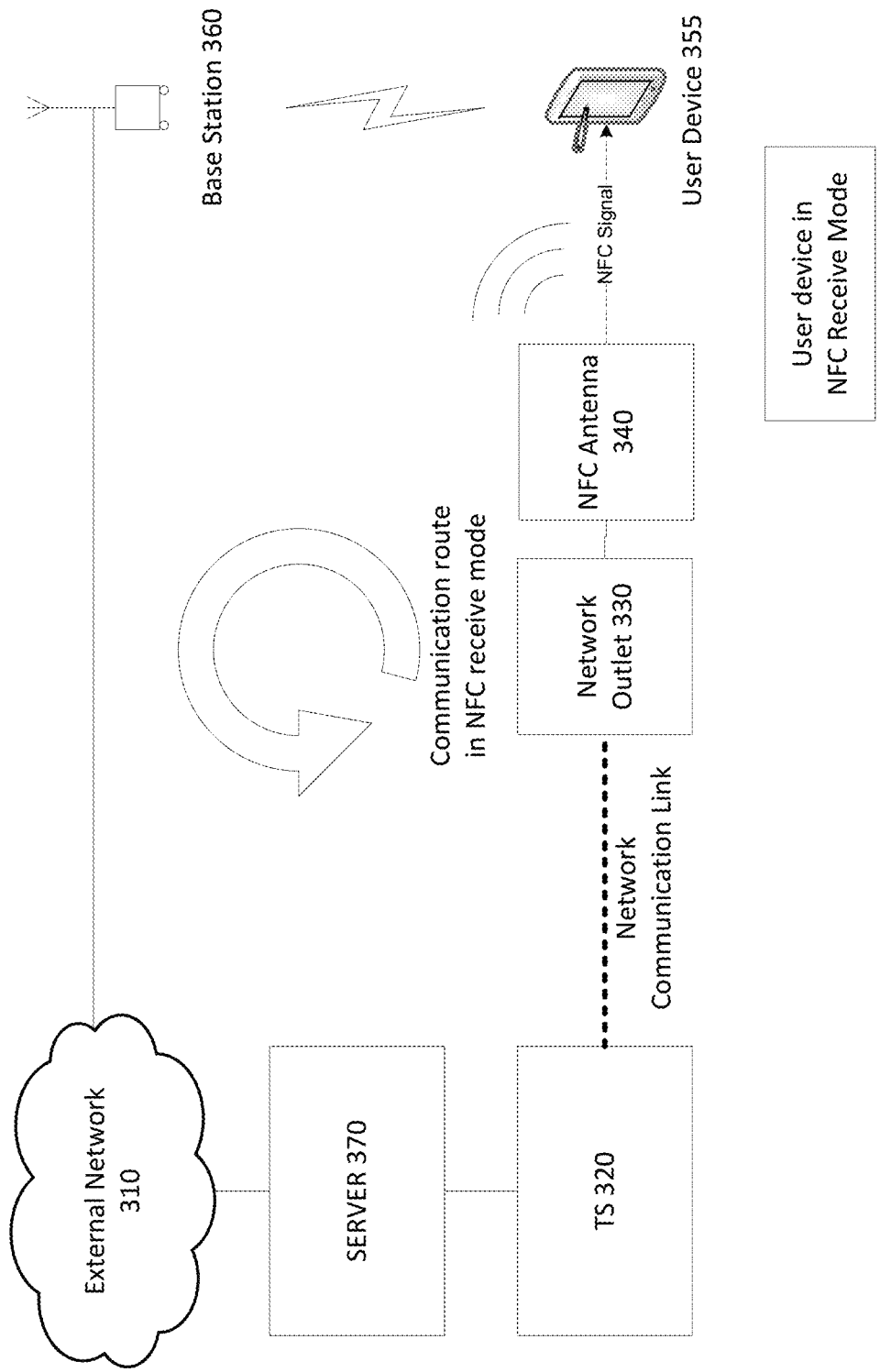
FIG. 3B shows an example diagram for performing an NFC reception from a network outlet in an NFC receive mode that can be used to implement any of the various features described herein.

FIG. 3A shows an example diagram for performing an NFC transmission through a network outlet in an NFC transmit mode (e.g., when a user places his/her NFC-equipped smartphone near a coaxial cable wall outlet, and the smart phone transmits an NFC signal to the coaxial cable connected to the coaxial cable wall outlet) that can be used to implement any of the various features described herein. FIG. 3B shows an example diagram for performing an NFC reception from a network outlet in an NFC receive mode (e.g., when a user places his/her NFC-equipped smartphone near a coaxial cable wall outlet, and the smart phone receives an NFC signal from the coaxial cable connected to the coaxial cable wall outlet) that can be used to implement any of the various features described herein. In FIG. 3A, an NFC transmission from a user device 350 to a TS 320 (e.g., a CMTS) via a network outlet 330 (e.g., a coaxial cable outlet) is shown. The user device 350 may be one of the wireless devices 116 described herein. In the NFC transmit mode ("NFC-to-Coaxial transmit mode"), a user device 350 generates an NFC signal. The user device 350 is located in proximity to the network outlet 330 so that an NFC signal generated by the user device 350 reaches a coaxial cable connector portion protruding from the network outlet 330 without significant signal attenuation. The distance between the user device 350 and the network outlet 330 may be within the NFC communication range discussed above. The NFC signal having the center frequency of about 13.56 MHz propagates via the coaxial cable line between the network outlet 330 and the TS 320. The NFC signal may be amplified by an amplifier (not shown) between the TS 320 and the network outlet 330.

In response to receiving the NFC signal via the coaxial cable line, the TS 320 may send a signal to the server 370. In response, the server 370 can communicate with the user device 350 via the base station 360. Via this communication route, the user device 350 may communicate with a remote device, such as the server 370, using an NFC signal (for transmission) and a cellular signal (for reception).

The coaxial cable connector may include, but is not limited to, BNC, SMA, TNC, Type F (e.g., F81 connector), RCA, SMB, MCX, MC-Card, Type-N, etc. The coaxial cable connector may serve as an NFC antenna. The coaxial cable connector is able to receive an NFC signal transmitted from a mobile device if the mobile device is located in proximity to the coaxial cable connector. The NFC signal received by the coaxial cable connector of a coaxial cable outlet travels through the coaxial cable line connected to the coaxial cable connector and reaches a CMTS. The CMTS can detect the NFC signal of the 13.56 MHz frequency band. An NFC antenna may be connected to the coaxial cable connector so that the NFC signal transmission (or an NFC reception shown in FIG. 3B) via the NFC antenna can be more reliable. As described below, a local DVR or cable modem can include its own NFC circuitry to process the NFC signal, and notify the headend (e.g., the server 370) of what kind of NFC signal it detected, so that the NFC signal does not have to travel to the TS 320.

The user device 350 also communicates with an access point, e.g., a base station 360, a relay, a Wi-Fi router, etc., by using communication protocols other than the NFC communication protocols. The base station 360 may be connected to the external network 310 and may communicate with the TS 320 via the external network. A mobile communication module of the user device 360 transmits or receives a cellular signal according to one or more mobile communication protocols.

Referring to FIG. 3B, some user devices 355 do not have an NFC transmission functionality although they include an NFC receiver and a cellular communication modem (or other alternative communication connection). In the NFC receive mode ("Coaxial-to-NFC transmit mode") shown in FIG. 3B, a user device 355 receives and processes an NFC signal but does not transmit an NFC signal. The user device 355 may receive an NFC signal traveled via a coaxial cable line and propagated from an NFC antenna 340 connected to a network outlet 330 (or directly from the coaxial cable outlet). The user device 355 is located in proximity to an NFC antenna 340 connected to the network outlet 330 so that an NFC signal propagated from the NFC antenna 340 can be received and processed by the user device 355. The distance between the user device 355 and the NFC antenna 340 may be within the NFC communication range discussed above. The TS 320 or one or more other coaxial network components between the TS 320 and the network outlet 330 may generate an NFC signal and send the generated NFC signal to the user device 355 via the coaxial cable line.

Figure 4:
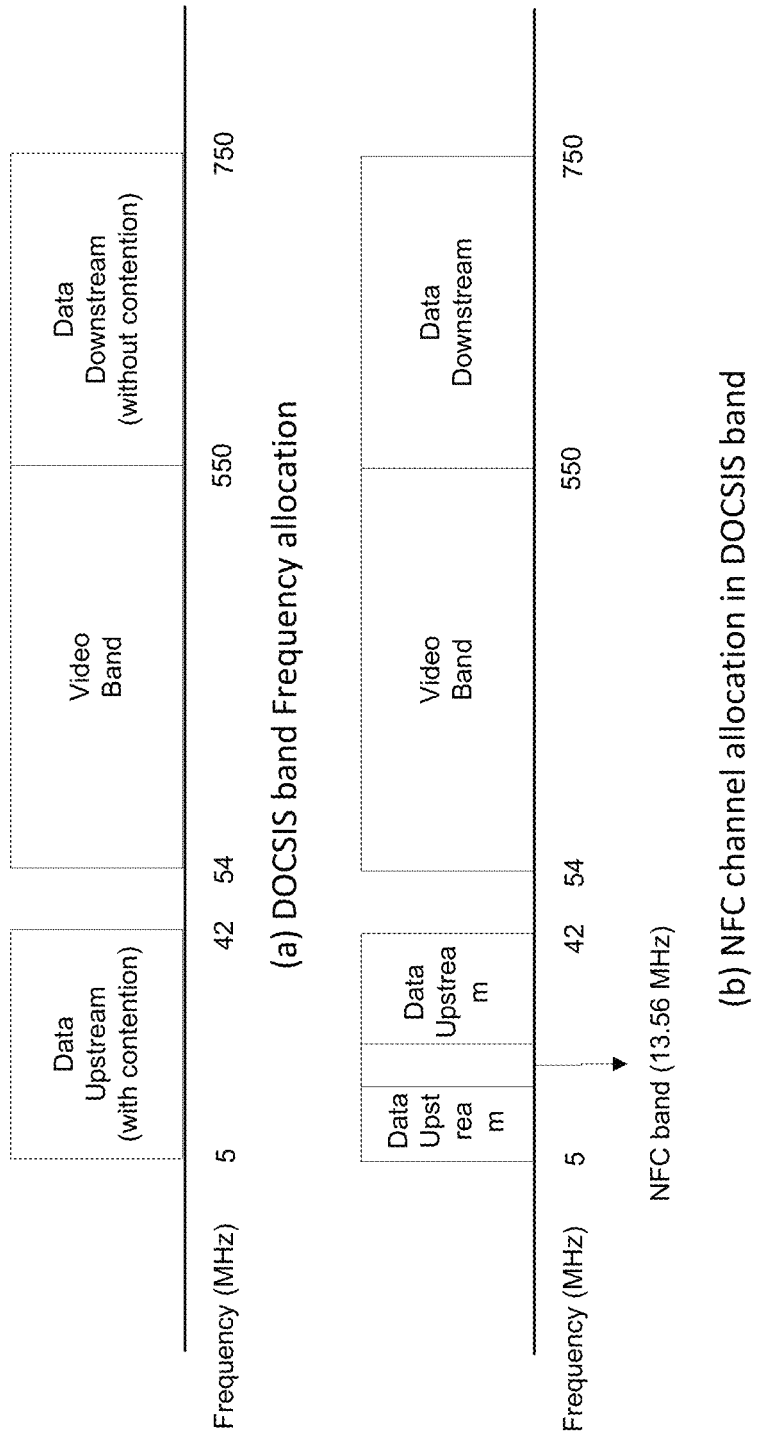
FIG. 4 shows (a) traditional Data Over Cable Service Interface Specification (DOCSIS) band frequency allocation and (b) NFC channel allocation in DOCSIS band.

As shown in FIGS. 3A and 3B, user devices 350 and 355 can perform a communication with a remote device using an NFC signal transmission via a coaxial cable line. FIG. 4 shows (a) traditional DOCSIS band frequency allocation and (b) NFC channel allocation in DOCSIS band. For the NFC transmit mode and the NFC receive mode, a portion of the DOCSIS upstream band may be allocated or reserved for NFC signal transmissions. For example, the frequency band between 13.46 MHz and 13.66 may be carved out for the NFC transmission including some guard bands (13.46~13.55 MHz and 13.57~13.66 MHz). The bandwidth of the NFC band and the guard bands may vary according to different frequency-band allocation requirements.

Figure 5:
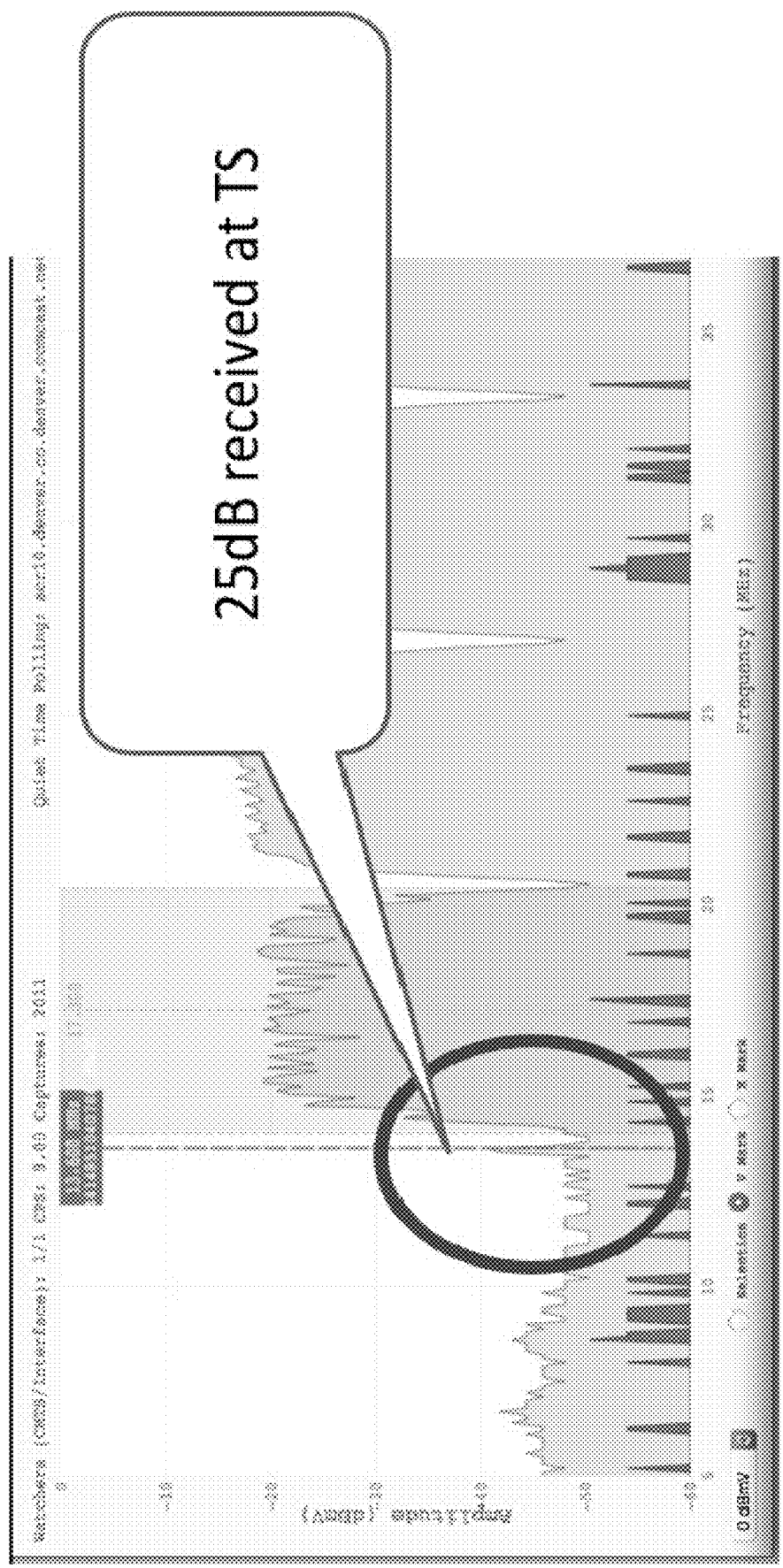
FIG. 5 shows a spectrum analysis result that shows a detection of an NFC signal in a Hybrid Fiber Coax (HFC) network.

The average noise level in a portion of the DOCSIS upstream frequency band in a determined coaxial cable line may be determined to determine the minimum signal strength of the NFC signal for transmission. For example, the average noise level between about 5 MHz and about 15 MHz in the DOCSIS upstream band may be determined. The NFC signal strength of an NFC signal to be generated by an NFC transmitter may be determined to be higher than a threshold offset from the average noise level so that the NFC signal propagating via a coaxial cable can be reliably distinguished by an NFC receiver or a spectrum analyzer. As shown in FIG. 5, the signal strength of the NFC signal received at a TS (e.g., CMTS) is greater than the average signal strength of noise in a frequency band between 10 MHz and 14 MHz. The difference between the signal strength of the NFC signal received at the TS and the average signal strength of noise in the frequency band is greater than the threshold offset (e.g., 3 dBmV) so that the NFC signal can be reliably determined by the TS. The generated NFC signal needs to have stronger signal strength than the signal strength of the NFC signal detected at the TS because of the signal attenuation in the coaxial cable network.

A portion of the HFC network may be selected for DOCSIS upstream bandwidth reallocation to enable an NFC transmission via a coaxial cable line. For the NFC band allocation, the cable line between the two nodes that requested an NFC communication via a coaxial cable network (e.g., the TS 320 and the network outlet 330) is determined. The two nodes may be determined based on a communication between the server 370 and the user device 350 via the base station 360 (or between the server 370 and the user device 355 via the base station 360). For example, the base station 360 can determine the location of the user devices 350 and 355 by receiving the recent GPS location data of the user devices 350 and 355. The user devices 350 and 355 may confirm the addresses of the premises 102 in which the user devices 350 and 355 are located. Once the addresses of the premises 102 are determined, the coaxial network between the TS 320 and the network outlet 330 of the premises 102 can be determined based on the HFC network topology. For example, the identity of the network outlet 330 (e.g., coaxial cable outlet identity) may be the address of the premises 102. The coaxial network connection for the upstream transmission between the determined TS 320 and the determined premises 102 can be selected, and the upstream band resource allocation of the selected coaxial network connection may be reconfigured so that the NFC band portion of the upstream band is assigned for an NFC transmission (see part (b) of FIG. 4).

The NFC communication over a coaxial cable network may be performed for various purposes. For example, the procedure may be performed to test the connectivity of a coaxial node or to perform a secured transaction (e.g., an online banking transaction, a passcode transmission, etc.), a video game, or the like using an NFC communication via a coaxial cable network. Hereinafter, various processes, steps, and/or methods will be described with reference to various figures. One or more processes, steps, and/or methods may be omitted or modified. Further, one or more process, steps, and/or methods may be performed in different orders other than the orders shown in one or more figures.

Figure 6:
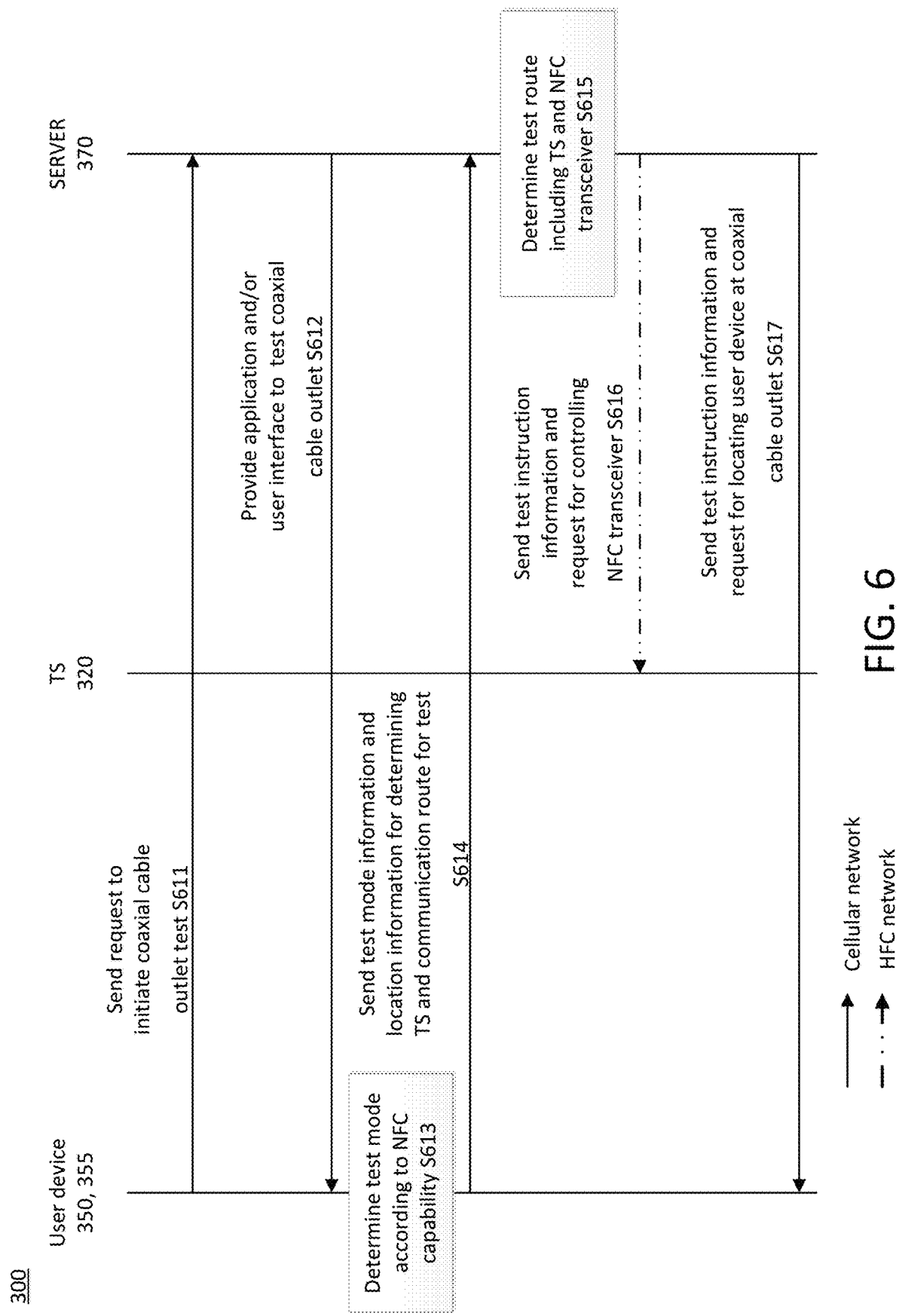
FIG. 6 shows an example of a message flow diagram for setting up an NFC transmission over a coaxial cable line that can be used to implement any of the various features described herein.

FIG. 6 shows an example of a message flow diagram for setting up an NFC transmission over a coaxial cable line that can be used to implement any of the various features described herein. In order to perform an NFC communication with a remote device via a coaxial cable network, the coaxial cable line is connected between a TS 320 and a coaxial node (e.g., a coaxial cable outlet). When a premises 102 is occupied by a different individual or a new premises 102 is constructed, a transfer of service or a new subscription is processed. The user may initiate a test for checking connectivity of a coaxial node in the premises 102 using a self-installation kit. In an example, a new homeowner may request to activate a service, and may receive a self-installation kit. As will be explained below, the user (the new homeowner) may place his/her NFC-equipped cellular phone near various coaxial cable terminals in the house, and then the system of the network service provider (e.g., a cable service provider) may walk the user through a diagnostic process that has the user placing his/her NFC-equipped cellular phone near various coaxial cable terminals in the house. In an example, the user may plug a device from the kit (e.g., a cable modem) into a coaxial cable outlet in the user's home, and then the system of the network service provider may walk the user through a diagnostic process that has the user placing his/her NFC-equipped cellular phone near the device (e.g., a cable modem) connected to the coaxial cable outlet in the house. Once the connectivity of a coaxial node is checked, the user can connect various network devices, e.g., a set-top box, Wi-Fi router, or the like, to the coaxial node and establish a coaxial cable connection with fewer trial and errors.

A user device 350, 355 may communicate with a server 370 (e.g., the NoC controller 122) to set up a test for the connectivity of a coaxial cable outlet at a premises 102. In step S611 in FIG. 6, the user device 350, 355 sends, to the server 370, a request to initiate a coaxial cable outlet test. For example, a user of a mobile device may access a web page that provides a coaxial cable outlet test option or access an application store to download a coaxial cable test application registered by a network service provider. It is assumed that the mobile device has established a wireless channel to communicate with the server 370 (e.g., the mobile device may communicate with the server 370 via a cellular network, and may send and receive a cellular signal). The user device 350, 355 may be a cellular mobile device. The request may be transmitted to the server 370 via a base station 360 and may be a cellular signal using a mobile communication protocol. Further, the request may be generated based on different wireless protocols, such as Wi-Fi, Bluetooth, etc. and access points can receive the request and transfer the request to the server 370.

Figure 7A:
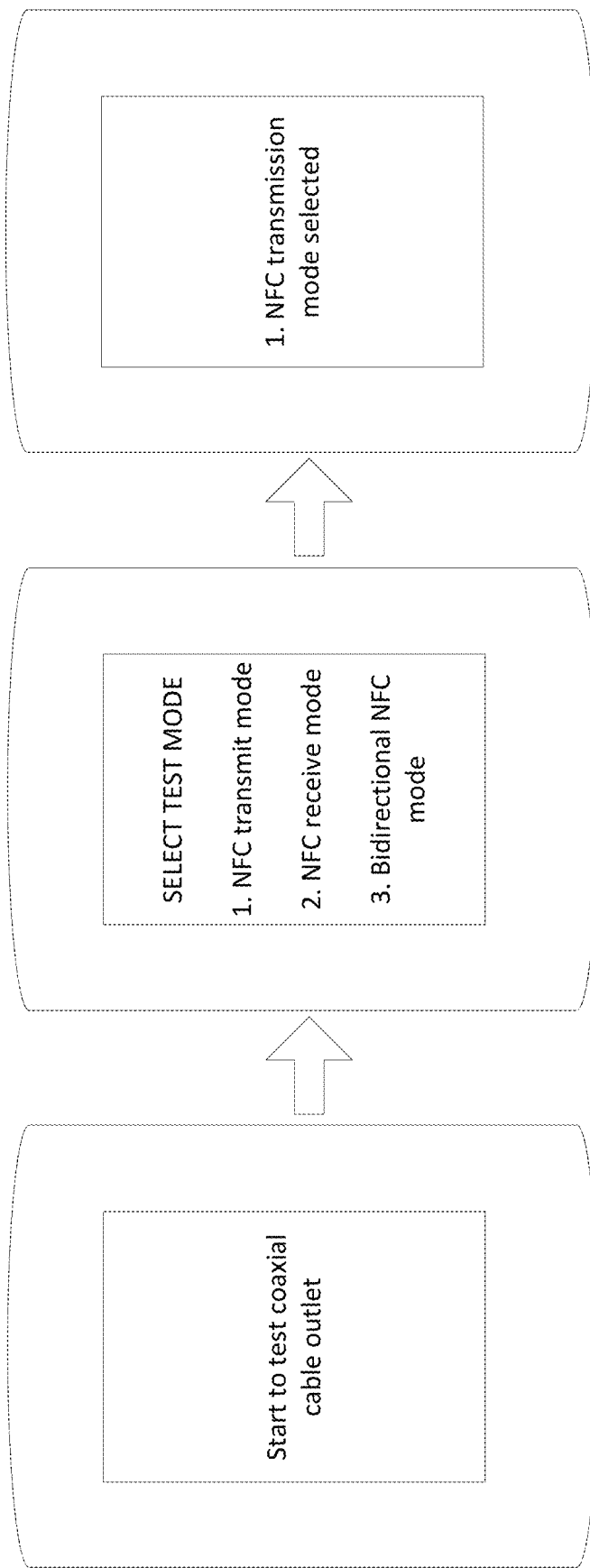

In step S612, the server 370 provides an application and/or a user interface to test a coaxial cable outlet. In an example, a user of a mobile device may download an application registered by a network service provider, and execute the application. Further, a web page may display a user interface, and the user of the mobile device may select an option to request a coaxial cable outlet test. In response to the user selection, the mobile device may send a cellular signal to server 370 of the network service provider, to request a coaxial cable outlet test. As explained in detail below, the cellular signal may include the location of the mobile device (e.g., the address of the premises) so that the server of the network service provider can determine a local NFC-equipped network element and a local coaxial cable line (e.g., an in-home coaxial cable wiring) to be tested. As shown in FIG. 7A, the user device 350, 355 displays a screen that provides a user interface to test a coaxial cable outlet. In step S613 in FIG. 6, the user device 350, 355 may determine a test mode according to the NFC capabilities of the user device 350, 355. As shown in FIG. 7A, the user interface may provide the user of the user device 350, 355 with an option to select a test mode. The user may select one of 1) an NFC transmit mode, 2) an NFC receive mode, and 3) a bidirectional NFC mode. If the NFC transmit mode is selected, the user device 350 transmits an NFC signal to a coaxial cable outlet but does not receive an NFC signal from the coaxial cable outlet (see e.g., FIG. 3A). If the NFC receive mode is selected, the user device 355 receives an NFC signal from a coaxial cable outlet but does not transmit an NFC signal to the coaxial cable outlet (see e.g., FIG. 3B). In the bidirectional NFC mode, a user device having both NFC transmission and reception capabilities transmits an NFC signal to a coaxial cable outlet and receives another NFC signal from the coaxial cable outlet. For example, a user device in a bidirectional mode may transmit an NFC signal to the server 370 as shown in FIG. 3A and receives an NFC signal as shown in FIG. 3B. The user device 350, 355 may run an NFC capability check (both the transmission and the reception capabilities) and determine a test mode based on the NFC capability check result.

Alternatively, or additionally, the test mode may be selected without a user selection. For example, the server 370 and/or the user device 350, 355 may determine the specification of the user device 350, 355 (e.g., the manufacturer of the user device 350, 355, the model number of the user device 350, 355, etc.). Then, the server 370 may determine, without the user selection, the NFC capabilities of the user device 350, 355 based on the specification of the user device 350, 355. For example, some Android smartphones may have both NFC transmission and reception capabilities while other smartphones, such as iPhones, may have only NFC reception capability without having the NFC transmission capability.

In step S614, the user device 350, 355 sends test mode information and location information to the server 370 so that the server 370 can determine a corresponding CMTS and a communication route for a test. The test mode information may include one of the NFC transmit mode, the NFC receive mode, or the bidirectional NFC mode. For example, the user device 350, 355 may send the determined test mode information after receiving a user selection or running the NFC capability checks. The determined test mode information can be used to determine the communication route for a test ("test route") as discussed above. The communication route for a test may be a communication route for an NFC transmit mode shown in FIG. 3A, a communication route for an NFC receive mode shown in FIG. 3B, or a bidirectional NFC mode. In the NFC transmit mode, in response to transmitting the NFC signal to the network outlet 330, the user device 350 receives a cellular signal from the base station 360. In the NFC receive mode, in response to transmitting a cellular signal to the base station 306, the user device 355 receives an NFC signal from the NFC antenna 340 connected to the network outlet 330.

The user device 350, 355 may transmit location information, such as GPS location data (e.g., GPS coordinate data, geolocation data, or the like), geographic information system (GIS) data, an address of the premises 102 in which the user device 350, 355 is located, etc. In step S615, the server 370 determines the test route including a corresponding CMTS and an NFC transceiver. For example, based on the location information received from the user device 350, 355 (see step S314), the server 370 can determine the corresponding TS 320 covering the HFC network toward the premises 102 in which the user device 350, 355 is located. The server 370 may also determine an NFC transmitter connected in the test route. For example, the corresponding TS 320 and/or other network components connected in the test route may have an NFC transceiver. The server 370 may select the NFC transceiver so that the NFC transceiver can detect an NFC signal transmitted from the user device 350, 355 via a coaxial cable line or transmit an NFC signal to the user device 350, 355 via a coaxial cable line.

Figure 7B:
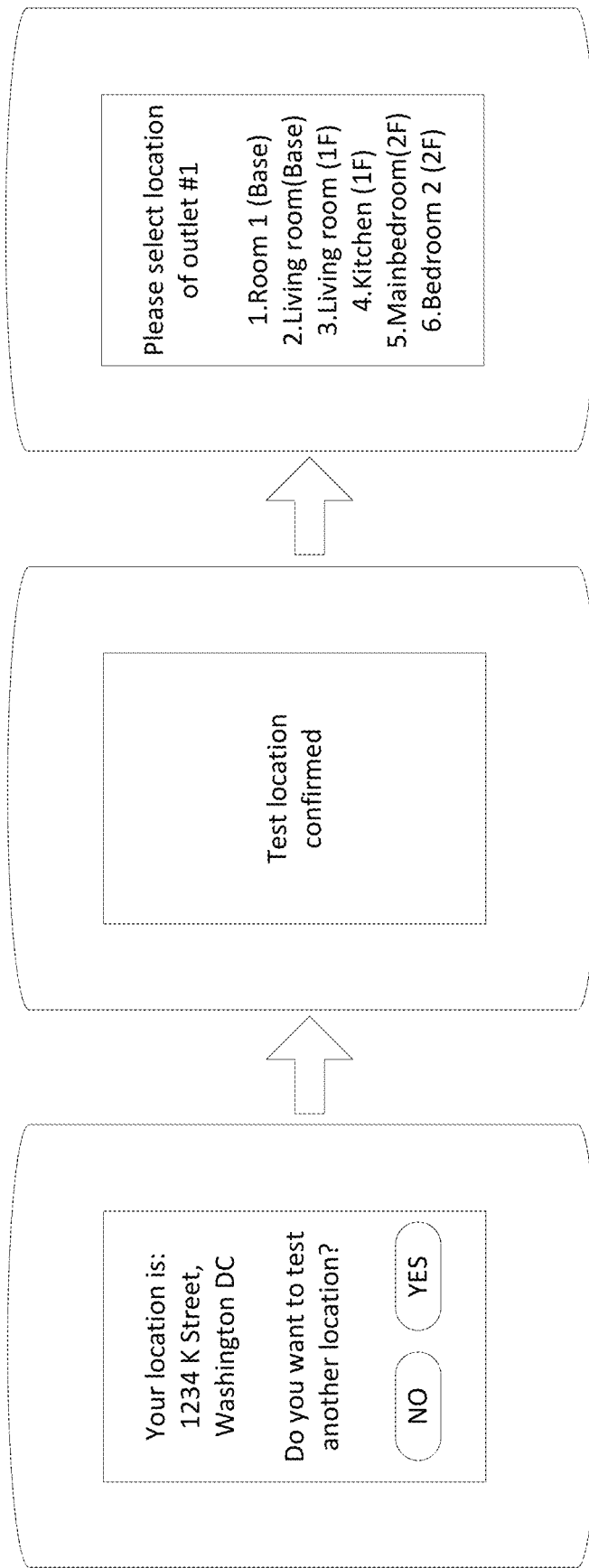

The server 370 may confirm the address of the premises 102 via a user interface displayed on the user device 350, 355. As shown in FIG. 7B, based on the location information of the user device 350, 355, the server 370 and the user device 350, 355 may determine that the user device 350, 355 is located at 1234 K Street, Washington D.C. The user device 350, 355 may display a user interface to confirm the address and may receive a user input to confirm the address or a user input to change the address of the premises 102. For example, the user interface asks whether the user of the user device 350, 355 wishes to test another location. If the user selects "No," the determined address is confirmed. If the user selects "Yes," the user interface of the user device 350, 355 may provide an input interface so that the user of the user device 350, 355 can input a different address or different location information.

The user interface may provide the user with selection options among different living spaces in the premises 102. The user of the user device 350, 355 attempts to test the coaxial cable outlet #1 by locating the user device 350, 355 in proximity to the coaxial cable outlet #1 (see FIG. 7C). As shown in FIG. 7B, after confirming the address, the user interface may display a list of various living spaces in the premises 102. The user may select one of the displayed living spaces in which the coaxial cable outlet #1 is located. If the user selects the second item, living room (base), the server 700 and the user device 350, 355 can store the location information of the coaxial cable outlet #1 in a database. After confirming that the coaxial cable outlet #1 is an outlet in the living room in the basement, the connectivity of the coaxial cable outlet #1 can be tested as described below. After the connectivity test, which will be described below, the user device 350, 355 and/or the server 700 may store the connectivity test result in association with the room information (the basement living room) of the coaxial cable outlet #1. Further, the coaxial cable outlet indicator (#1) of the coaxial cable outlet #1 may also be stored in association with the test result. After the user confirmation of the basement living room, the basement living room of the premises 102 may be stored as the identity of the coaxial cable outlet #1.

In step S616, the server 370 sends, to the corresponding TS 320, test instruction information for a CMTS and a request for controlling the NFC transceiver. For example, the server 370 may be one of the headend servers discussed above (e.g., the NOC controller 122) and may be connected to the corresponding TS 320. The connection between the TS 320 and the server 370 may be a wired connection in an HFC network as shown in FIG. 1A and FIG. 1B. Via that connection, the server 370 may send the test instructions. The test instruction information may include a location identifier of the premises 102 in which the user device 350, 355 is located, NFC communication resources (e.g., assigned timeslots for NFC transmission or reception, one or more upstream paths between the TS 320 and the premises 102, etc.), a coding scheme, a data rate, a modulation scheme, etc. For example, an NFC transmission may be assigned in timeslot 1 for 10 seconds and an NFC reception monitoring may be performed in timeslot 2 for 20 seconds because of an NFC transmission delay in the determined coaxial cable line. The one or more upstream paths are determined based on the address of the premises 102 and HFC network topology connecting the premises 102 and the TS 320. The TS 320 may determine a corresponding NFC transceiver based on the one or more upstream paths. After sending the test instructions, the TS 320 can set up an NFC communication with the user device 350, 355 via a coaxial cable connection between the TS 320 and the coaxial cable outlet in the selected premises 102. The NFC communication set-up process will be described below in more detail.

In step S617, the server 370 sends, to the user device 350, 355, test instruction information for the user device 350, 355 and a request for locating the user device 350, 355 at a coaxial cable outlet. For example, the server 370 may send a cellular signal to the user device 350, 355, and the cellular signal may include the request. The user device 350, 355 may display a message "please locate your phone at a coaxial cable outlet." The user device 350, 355 may output a voice message requesting the user to locate the user device 350, 355 at a coaxial cable outlet for testing. The test instruction information sent to the user device 350, 355 may include NFC communication resources (e.g., the assigned timeslots for NFC transmission or reception, the one or more upstream paths between the TS 320 and the premises 102, etc.), NFC signal transmission power, a coding scheme, a data rate, a modulation scheme, etc. If the server 370 determines the NFC signal transmission timeslots, the server 370 may indicate, as the assigned timeslots, when the user device 350 should send an NFC signal to the TS 320 or when the user device 355 should monitor an NFC signal generated by the TS 320. For example, the user device 350, 355 may display, to the user, a message "an NFC signal will be generated by your phone in 5 seconds. Please locate your phone at coaxial cable outlet #1" or a message "an NFC signal will be sent to coaxial cable outlet #1 in 5 seconds. Please locate your phone at coaxial cable outlet #1." The one or more upstream paths between the TS 320 and the premises 102 may indicate a portion of the network topology between the TS 320 and the coaxial cable outlet #1, including an identifier of an NFC transceiver between the TS 320 and the coaxial cable outlet #1. The user device 350, 355 may store the identifier of the NFC transceiver. The NFC signal transmission power may be determined by the server 370 based on the distance between the coaxial cable outlet #1 and the NFC transceiver and historical signal degradation data in the upstream path. For example, the NFC transceiver may report, to the server 370, the received NFC signal strength, Signal-to-Noise ratio, etc. The server 370 may increase the NFC signal transmission power if the report indicates that the quality of the received NFC signal is poor.

In order to enhance the verification of NFC signal reception from a pre-designated NFC transmitter, a verification code may be transferred via an NFC signal. The NFC transceiver connected to a coaxial cable network may receive a plurality of NFC signals transmitted from a plurality of user devices located in the same apartment complex. It may be difficult for the NFC transceiver to determine which NFC signal was generated by which user device. A unique verification designated for a single user device may be helpful in performing a plurality of coaxial cable line tests simultaneously. For example, the server 370 may assign a unique verification code to the user device 350, 355 and the TS 320. The server 370 may also inform the TS 320 of a matching table between a plurality of verification codes and corresponding user devices. For example, one verification code or a group of verification codes may correspond to one user device. The server 370 may indicate that the NFC signal between the user device 350, 355 and the TS 320 will transfer the unique verification code. When an NFC transmitter controlled by the TS 320 or an NFC transmitter of a user device 350, 355 generates an NFC signal, the verification code may be encoded as data in the generated NFC signal. Based on the detection of the NFC signal and decoding of the verification code, the NFC signal communication via a coaxial cable line can be more reliably tested. The verification code may also be used in an authentication (e.g., for a secured online banking transaction).

Further, a verification code may include an identifier of a network service provider. For example, different network service provider may use different codes to confirm that the mobile device 350, 355 and the server 370 are testing an HFC network of a particular service provider. A plurality of network service providers (e.g., Comcast) may be available for a premises 102, the user of the mobile device 350, 355 and the server 370 of a particular service provider may use the identifier of the network service provider in the NFC communication over the HFC network. Examples of using the verification code will be described below in more detail. After performing one or more operations shown in FIG. 6, the one or more operations including an NFC signal transmission via a coaxial cable line may be performed.

Figure 8A:
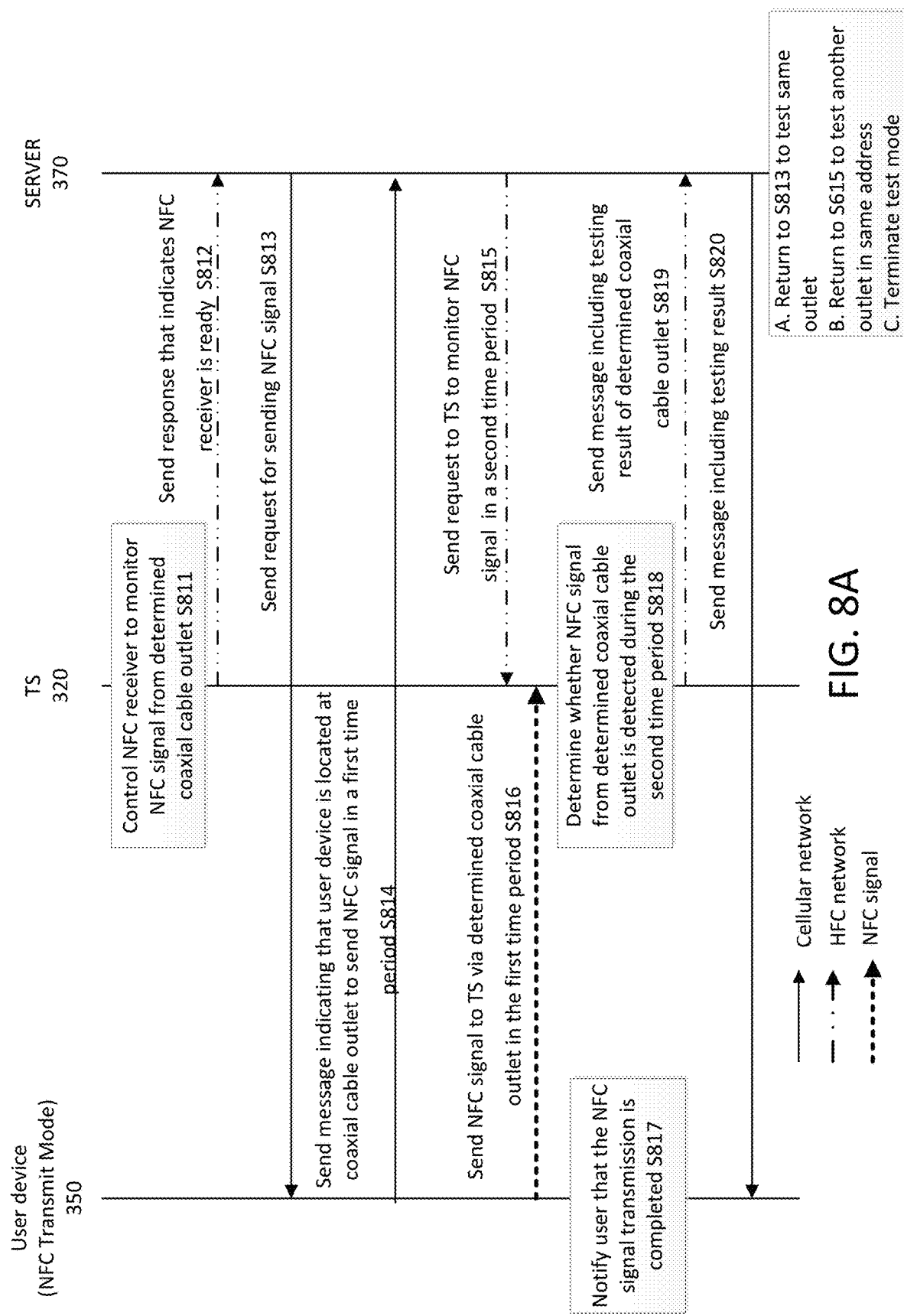
FIG. 8A shows an example of a message flow diagram for testing a coaxial cable outlet using an NFC transmission over a coaxial cable line in which the user device is in an NFC transmit mode that can be used to implement any of the various features described herein.

FIG. 8A shows an example of a message flow diagram for testing a coaxial cable outlet using an NFC transmission over a coaxial cable line with a user device in which the user device is in an NFC transmit mode. One or more operations shown in FIG. 8A may be performed after performing one or more operations shown in FIG. 6. In FIG. 8A, the user device 350 is in an NFC transmit mode. In various examples, a communication between the user device 350, 355 and the server 370 is performed via a cellular network, and a communication between the server 370 and the TS 320 is performed via an HFC network. In various figures, an NFC signal transmission is shown as a dotted arrow, while other types of arrows indicate different types of signaling (e.g., a cellular signal, a cable signal in an HFC network in accordance with the DOCSIS format). In one or more figures, the double-dashed line indicates a signal transmission via the HFC network in accordance with the DOCSIS standards, or any other desired standard that does not overlap and interfere with the NFC signals.

In step S811, the TS 320 controls an NFC receiver to monitor an NFC signal from a determined coaxial cable outlet. This may occur, for example, if the user makes a phone call or invokes an application requesting testing of the user's coaxial network. The TS 320 may determine a coaxial network box in the premises 102 to be a destination node to which an NFC signal will be sent or an origination node from which an NFC signal will be transmitted. The plurality of coaxial cable outlets in the premises 102 may be connected to the coaxial network box that includes one or more coaxial cable elements, such as a splitter, a filter, a mux, etc. If the server 370 receives some identification data from the user device 350 via a mobile communication network (see e.g., S614 in FIG. 6), the TS 320 may acquire, from the server 370, the identity of the coaxial cable outlet (e.g., the address of the premises in which the coaxial cable outlet is installed, the coaxial cable outlet indicator of a coaxial cable outlet and/or room information of the premises).

In step S812, the TS 320 sends a message that indicates an NFC transceiver controlled by the TS 320 is ready for receiving an NFC signal from the determined coaxial cable outlet. The message sent by the TS 320 may be a response to the test instructions received from the server 370 (see e.g., step S616 in FIG. 6). If the server 370 receives the message within an expected time after sending the test instructions, the server 370 may determine that the TS 320 is ready for receiving an NFC signal from the user device 350. If the server 370 does not receive the message within the expected time after sending the test instructions, the server 370 may resend the test instructions and monitor the message again.

Figure 8B:
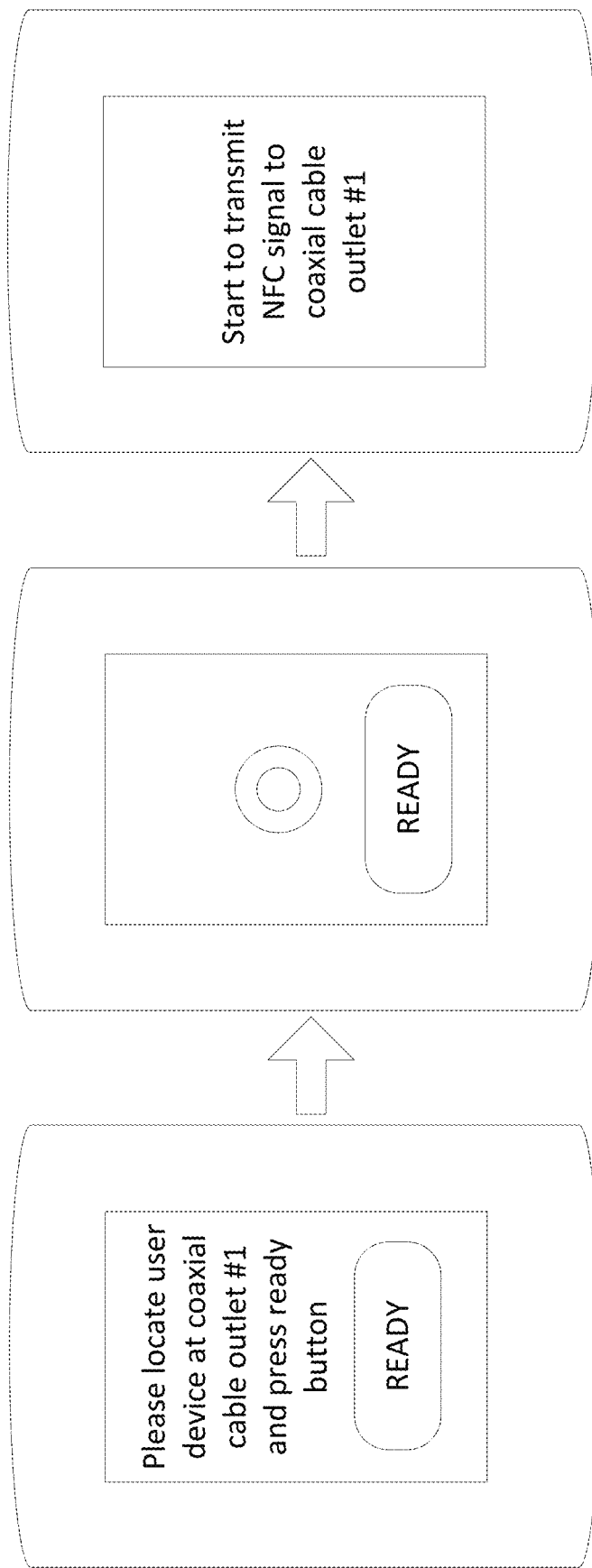

In step S813, the server 370 sends, via the cellular network and to the user device 350, a request for sending an NFC signal. For example, the server 370 sends the request to the user device 350 through the external network 310 and the base station 360 (see FIG. 3A), and the user device 350 receives a cellular signal including the request. The server 370 may send, to the user device 350 and as a request, a message for sending an NFC signal. In response to receipt of the message, the user device 350 may send an NFC signal as a response. Additionally, or alternatively, the user device 350 may send a signal inquiring whether the user device 350 can send an NFC signal. In response, the server 370 may send, to the user device 350 and as an authorization, a message for sending an NFC signal. As shown in FIG. 8B, in response to receiving the request, the user device 350 may display an instruction message to the user of the user device 350. For example, the instruction message may indicate "start to transmit NFC signal to coaxial cable outlet #1."

In step S814, the user device 350 sends, via a cellular network and to the server 370, a message indicating that the user device 350 is located at a coaxial cable outlet to send an NFC signal. After the user device receives the test instruction information and the request for locating the user device 350 at the coaxial cable outlet (see step S617 in FIG. 6), the user device may perform the step S814 as a response.

As shown in FIG. 8B, in response to receiving the request for locating the user device 350 at the coaxial cable outlet, the user device 350 may display an instruction message "Please locate user device at coaxial cable outlet #1 and press ready button." If the user of the user device 350 pushes the "ready" button displayed on the display screen of the user device 350, the user device 350 sends the message indicating that the user device 350 is located at the coaxial cable outlet #1.

The message sent in the step S814 may include a notification indicating a first time period in which the NFC signal is to be sent from the user device 350. The notification may be transferred to the server 370 via a cellular signal so that the server 370 can instruct the TS 320 to monitor the NFC signal. For example, in step S815, the server 370 sends the request to the TS 320 so that the CMTS can monitor an NFC signal in a second time period. The NFC receiver, located along the path between the user device 350 and the TS 320, may detect an NFC signal, transmitted from the user device 350, more accurately and reliably if the NFC receiver knows when the NFC signal is expected to be received by the NFC receiver. The NFC receiver need not be in a direct path between the user device 350 and the TS 320, and may simply be located at another point in the coaxial network. The server 370 knows the NFC signal transmission delay based on historical NFC transmission communication data along the path. Thus, the server may calculate the delay from the first time period to obtain the second time period. Thus, the first time period may start before the start of the second time period. However, the first time period may partially overlap the second time period depending on the delay of the particular path between the user device 350 and the NFC transceiver. Since there is a propagation delay of the NFC signal in the coaxial cable line, the NFC signal reaches the NFC receiver controlled by the TS 320 some time after the user device 350 sends the NFC signal. The monitoring period ("the second period") may be the same or longer than the first period. For example, the user device 350 may send an NFC signal in a time period between 13:32:03.02 and 13:32:08.02 (five seconds), and the NFC receiver in the path may monitor the NFC signal between 13:32:03.38 and 13:32:13.38 (ten seconds).

In step S816, the user device 350 generates and sends the NFC signal to the TS 320 via the determined coaxial cable outlet in the first time period. For example, as shown in FIG. 8C, a user device is placed in proximity to a coaxial cable outlet and generates an NFC signal. The NFC signal propagates toward the coaxial cable outlet and induces an RF coupling at the coaxial cable connector of the coaxial cable outlet. The NFC signal received by the coaxial cable connector is transferred to the TS 320 via the coaxial cable line connected to the coaxial cable connector. In step S817, the user device 350 may notify the user that the NFC signal transmission has been completed. For example, the user device 350 may display a message indicating that the NFC signal has been transmitted. In step S818, the user device 350 may notify the user of the user device 305 that the NFC signal transmission has been completed. For example, the user device 350 may display a notification message on a display screen to indicate the completion of the NFC signal transmission.

The user device 350 may determine that it is placed in proximity to a coaxial cable outlet by using one or more of its sensors, such as an accelerometer, a gyroscope, a camera, etc. For example, one or more cameras of the user device 350 may capture and detect video images of the coaxial cable outlet and determine that the user device 350 is placed in proximity to the coaxial cable outlet. Accelerometers and/or gyroscope sensors may detect the acceleration of the user device 350 so that the user device 350 can determine whether it remains in proximity to the coaxial cable outlet.

The user device 350 may provide a user interface to receive a user input to generate an NFC signal. For example, a push button may be displayed on a touch screen of the user device 350. If the user touches the push button, an NFC signal may be generated for a certain period of time (e.g., for ten seconds). After generating the NFC signal, the touch screen may display a notification message that the NFC signal transmission has been completed.

In step S818, during the second time period, the TS 320 monitors the NFC signal and determines whether an expected NFC signal from the determined coaxial cable outlet is detected. The user device 350 ramps up the NFC signal to the maximum data rate to generate peak field strength. The TS 320 may activate peak-to-average (PAR) detection. The PAR detection may be repeated on pseudo-random pattern until satisfactory correlation is achieved. Because the NFC uses the fixed frequency around 13.56 MHz and the NFC receiver may be non-coherent, the NFC signal detection by the NFC receiver may have some false positives. The pseudo-randomization for power detection may reduce the false positives caused by unintended signals, such as spurious noises or other NFC interferences. For example, the NFC signal power and time may be modulated according to a pseudo-random pattern assigned to the user device 350, and the NFC receiver may expect to detect the pseudo-random pattern used by the user device 350.

In step S819, the TS 320 may send, to the server 370, a message including a testing result of the determined coaxial cable outlet. If the TS 320 detects the NFC signal during the second time period, the message includes a testing result indicating the receipt of the NFC signal. The testing result may also include the received NFC signal strengths and receipt time. The TS 320 may also decode the NFC signal and detect a verification code from the NFC signal. If the TS 320 does not detect an NFC signal during the second time period, the TS 320 sends a testing result indicating that an NFC signal has not been received.

In step S820, the server 370 sends a message including the testing result reported from the TS 320 to the user device 350 via a cellular signal. Based on the testing result, the user device 350 can determine that whether the coaxial cable connection between the determined coaxial cable outlet and the TS 320 is proper or not. In response to the unsuccessful NFC reception, the server 370 may return to the steps S813 to repeat the NFC signal transmission and monitoring of the transmission for testing the same coaxial cable outlet. The operation may return to the step S615 in FIG. 6 to test another coaxial cable outlet in the same premises 102. If the user of the user device 350 selects to terminate the test mode, the test mode may be terminated.

Figure 9:
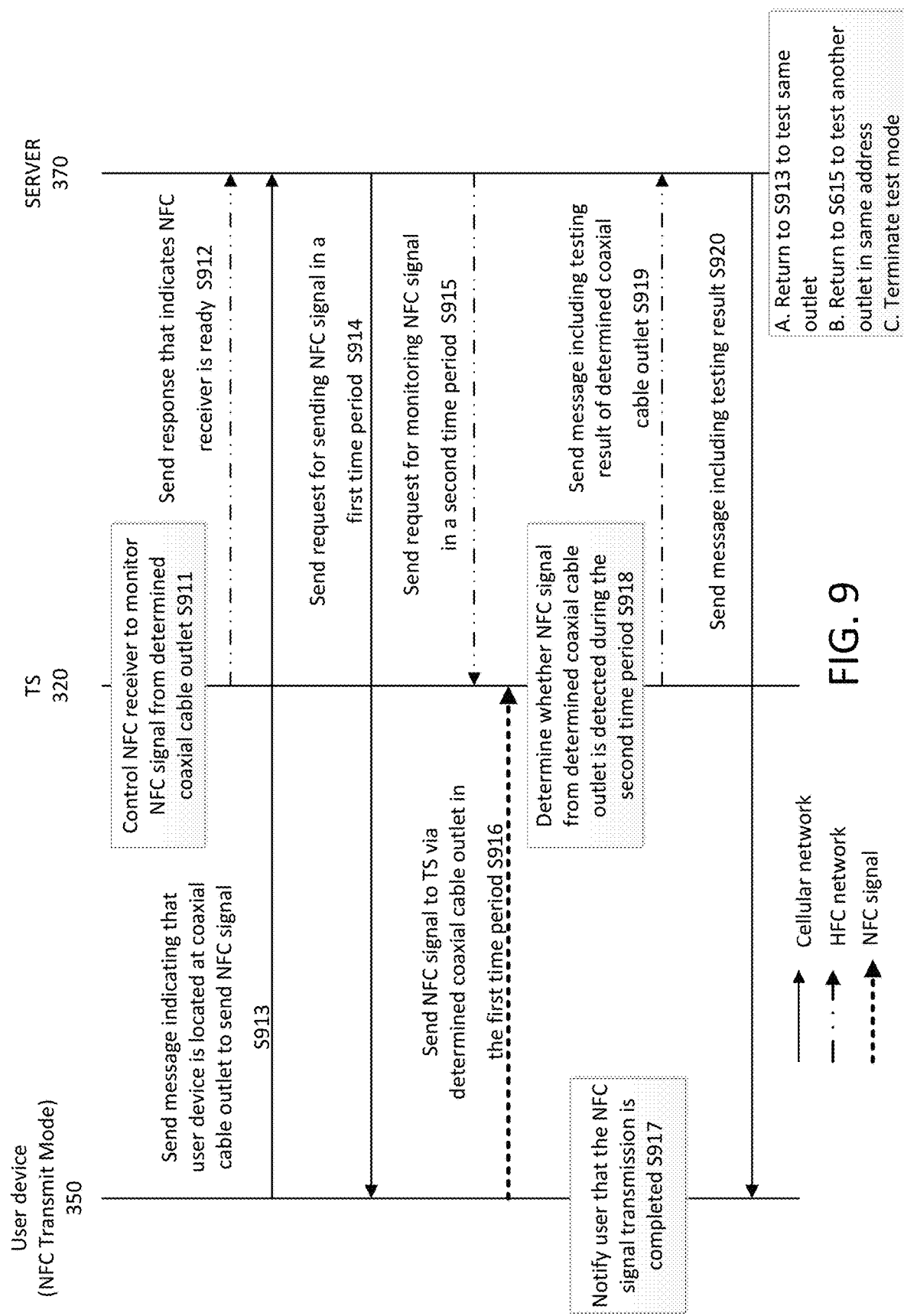
FIG. 9 shows an example of a message flow diagram for testing a coaxial cable outlet when a server controls NFC transmission and monitoring time periods in an NFC transmit mode.

FIG. 9 shows an example of a message flow diagram for testing a coaxial cable outlet when a server controls NFC transmission and monitoring time periods in an NFC transmit mode. Various features and steps shown in FIG. 9 are similar to those described above with respect to FIG. 8A. For a concise description, those similar features may not be described below. Steps S911 and S912 may be as described in steps S811 and S812 above, respectively.

In step S913, the user device 350 may send a message indicating that the user device 350 is located at a coaxial cable outlet to send an NFC signal.

The server 370 may notify the user device 350 of the first time period described above ("NFC transmit time period")

and notify the TS 320 of the second time period described above ("NFC monitoring time period"). For example, in step S914, the server 370 may determine the first time period described above with respect to FIG. 8A, and send, to the user device 350 and via a cellular network, a request for sending an NFC signal in the first time period. Based on an estimated propagation delay between the NFC signal transmission from the user device 350 and the NFC signal reception by an NFC receiver controlled by the TS 320, the server 370 may determine the second time period described above with respect to FIG. 8A. In step S915, the server 370 may send a request, to the TS 320 and via an HFC network, a request for monitoring the NFC signal in the second time period. Steps S916, S917, S918, S919, and S920 may be as described in steps S816, S817, S818, S829, and S820 above, respectively.

Figure 10:
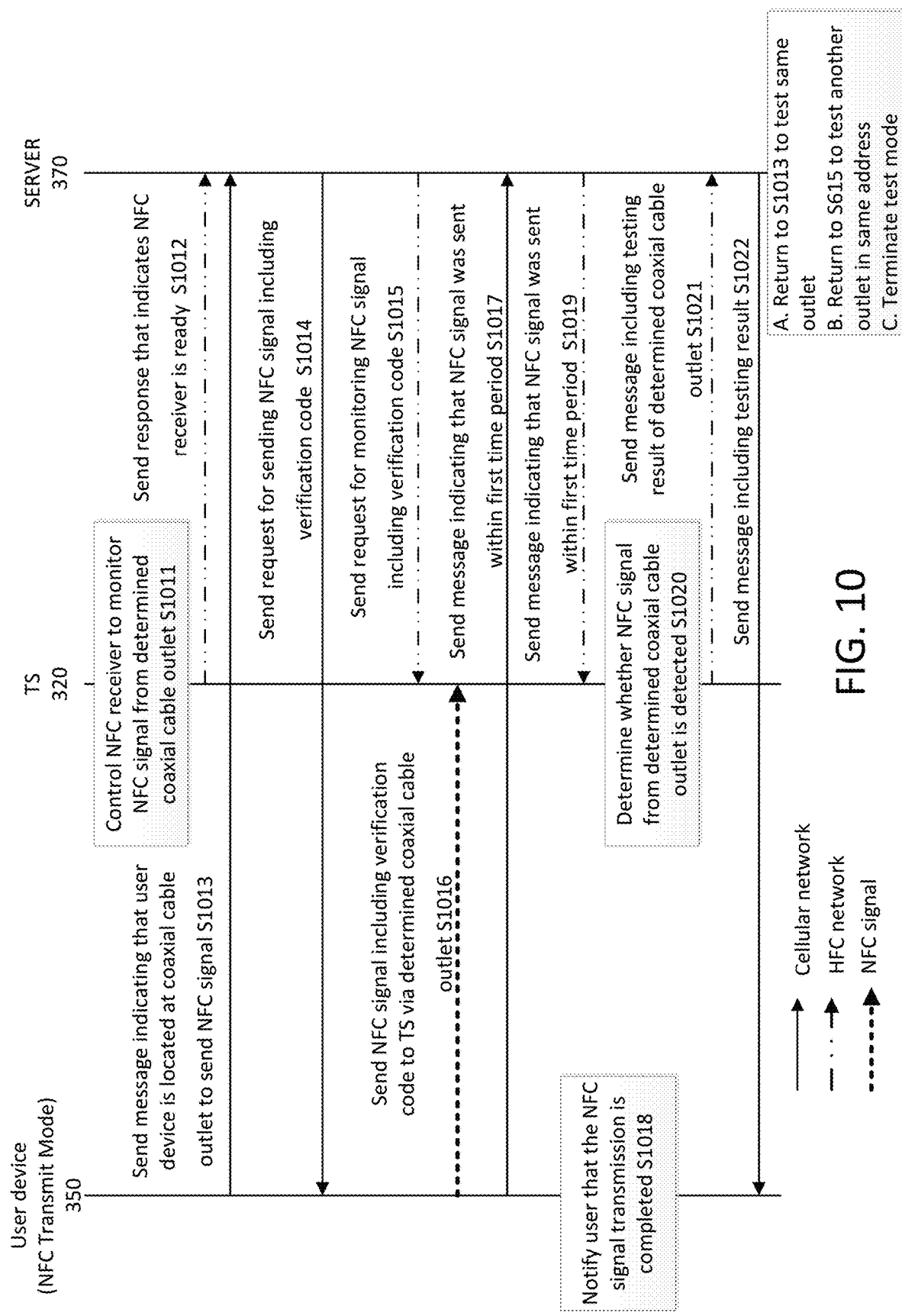
FIG. 10 shows an example of a message flow diagram for testing a coaxial cable outlet using a verification code with an NFC signal in an NFC transmit mode.

FIG. 10 shows an example of a message flow diagram for testing a coaxial cable outlet using a verification code with an NFC signal in an NFC transmit mode. Various features and steps shown in FIG. 10 are similar to those described above with respect to FIGS. 8A and 9. For a concise description, those similar features may not be described below. Steps S1011, S1012, and S1013 may be as described in steps S911, S912, and S913 above, respectively.

As described above, a unique verification code may be used in enhancing the NFC signal detection accuracy. Further, the verification code may be used in distinguishing a corresponding user device from other NFC signals generated by other user devices. For example, in step S1014, the server 370 may send, to the user device 350 and via a cellular network, a request for sending NFC signal including a verification code. The verification code may be a temporary code generated by the server 370 and may be a uniquely assigned code for the user device 350 at least for a time period in which the verification code has not been expired with respect to the user device 350. In step S1015, the server 370 may send a request, to the TS 320 and via an HFC network, a request for monitoring the NFC signal including the verification code.

The verification code may enhance the security of the NFC signal communication via the HFC network. As described above, both the NFC transmitter and the NFC receiver are notified that the NFC signal carries the verification code. The verification code may be used as a passcode for an authentication process to enhance the security of the NFC signal communication via the HFC network.

In step S1016, the user device 350 may send, to the TS 320 and via the determined coaxial cable outlet, an NFC signal including the verification code. The user device 350 may send, to the server 370 and via a cellular network, a message indicating that the NFC signal was sent during a first time period (step S1017). Step S1018 may be as described in step S918 above. In response to the message indicating that the NFC signal was sent during the first time period, the server 370 may send, to the TS 320 and via the HFC network, a message indicating that the NFC signal was sent during the first time period (step S1019). The NFC receiver controlled by the TS 320 may monitor the NFC signal for a certain time period longer than the transmission duration of the NFC signal. The TS 320 may determine, based on the first time period, an expected NFC reception time period in which the NFC signal is expected to be received. The TS 320 may analyze the received signal spectrum corresponding to the expected NFC reception time period to determine whether an NFC signal was received during the expected NFC reception time period. Further, the TS 320 may analyze other monitoring durations if the NFC signal was not received during the expected NFC reception time period because the NFC signal may be received earlier or later than the expected NFC reception time period. In step S1020, the TS 320 may determine, based on the analysis, whether the NFC signal from the determined coaxial cable outlet is detected. Steps S1021 and S1022 may be as described in steps S919 and S920 above, respectively.

Figure 11:
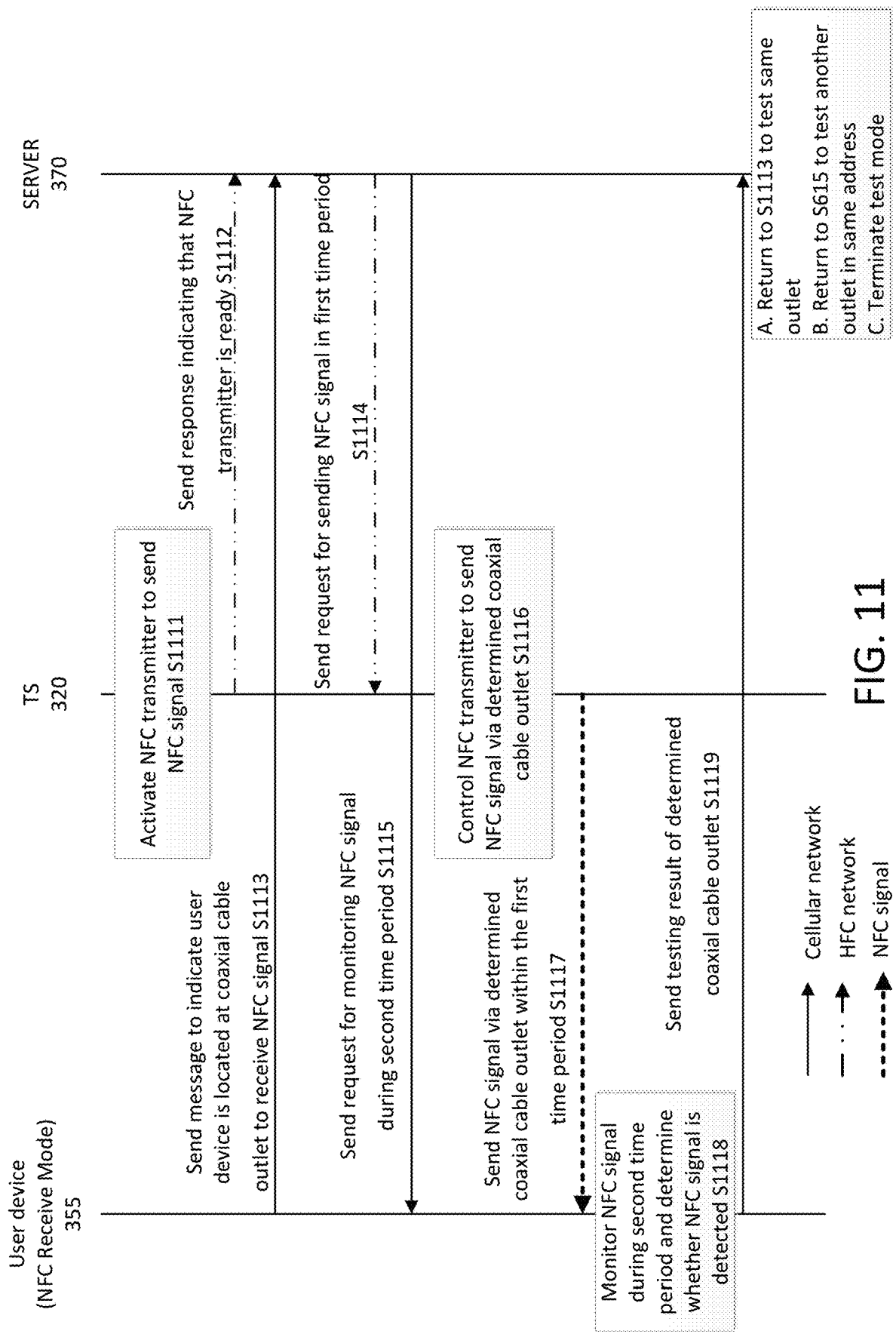
FIG. 11 shows an example of a message flow diagram for testing a coaxial cable outlet using an NFC transmission over a coaxial cable line in which the user device is in an NFC receive mode that can be used to implement any of the various features described herein.

FIG. 11 shows an example of a message flow diagram for testing a coaxial cable outlet using an NFC transmission over a coaxial cable line in which the user device is in an NFC receive mode.

The user device 355 may be operating in an NFC receive mode. After receiving test instructions from the server 370 (e.g., step S616 in FIG. 6), the TS 320, in step S1111, may activate an NFC transmitter (or NFC transceiver) to send an NFC signal to the user device 355 via the HFC network. The path between the user device 355 and the TS 320 may be determined based on the test instructions received from the server 370 (e.g., similar to the path between the user device 350 and the TS 320 described above). In step S1112, the TS 320 may send a response indicating that an NFC transmitter (or an NFC transceiver) is ready. Step S1113 may be as described in step S1013 above.

In step S1114, the server 370 may send, to the TS 320 and via the HFC network, a request for sending an NFC signal in a first time period (e.g., the first time period described above with respect to FIG. 9). In step S1115, the server 370 may send, to the user device 355 and via the cellular network, a request for monitoring the NFC signal during a second time period (e.g., the second time period described above with respect to FIG. 9). The NFC signal is to be sent by the NFC transmitter of the TS 320. Additionally or alternatively, the server 370 may send information about the NFC signal transmission time to the user device 355 so that the user device 355 can determine when the NFC signal will be sent by the TS 320 or estimate when the user device 355 will likely receive the NFC signal.

In step S1116 and as a response to the step S1114, the TS 320 may control the NFC transmitter to send the NFC signal to the user device 355 via the determined coaxial cable outlet. In step S1117, the NFC transmitter controlled by the TS 320 sends, to the determined coaxial cable outlet and via the HFC network, the NFC signal during the first time period. If the HFC network connection between an end of a coaxial cable line at the determined coaxial cable outlet and the NFC transmitter, the end of the coaxial cable line creates an electromagnetic induction with an NFC receiver of the user device 355 (when the user device 355 is located in proximity to the coaxial cable outlet). The end of the coaxial cable line may include an NFC antenna to induce the electromagnetic induction to the NFC receiver of the user device 355. In step S1118, the user device 355 may monitor an NFC signal reception during the second time period and determine whether the NFC signal is received. In step S1119, the user device 355 may send, to the server 370 and via the cellular network, a testing result of the determined coaxial cable outlet. The test indicates that the cable line between the TS 320 and the determined coaxial cable outlet is connected if the user device 355 receives the NFC signal.

Figure 12:
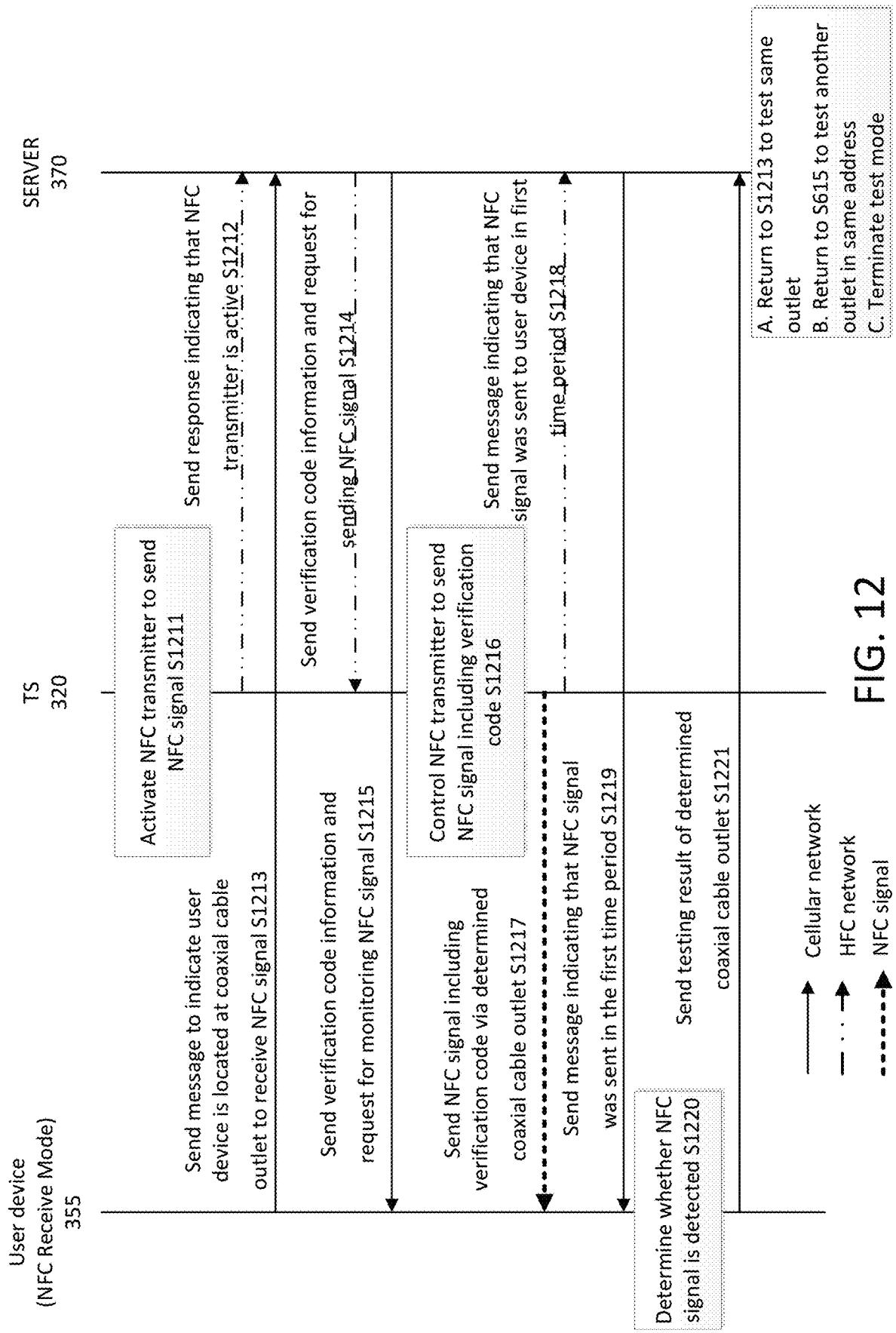
FIG. 12 shows an example of a message flow diagram for testing a coaxial cable outlet using a verification code with an NFC signal in an NFC receive mode.

FIG. 12 show an example of a message flow diagram for testing a coaxial cable outlet using a verification code with an NFC signal in an NFC receive mode. Various features and steps shown in FIG. 12 are similar to those described above with respect to FIGS. 8A, 9, 10, and 11. For a concise description, those similar features may not be described below. Steps S1211, S1212, and S1213 may be as described in step S1111, S1112, and S1113 above, respectively.

The server 370 may send information of a verification code to the TS 320 and the user device 355 (see steps S1214 and S1215, respectively). In step S1216, the TS 320 may control an NFC transmitter to send an NFC signal including the verification code. In step S1217, the TS 320 may send, toward the determined coaxial cable outlet and via the HFC network, the NFC signal including the verification code. An NFC receiver of the user device 355 located at the coaxial cable outlet may receive the NFC signal via an electromagnetic induction induced from an end of a cable line connected to the coaxial cable outlet. As described above, the end of the cable line may include an NFC antenna. After sending the NFC signal during a first time period, the TS 320 may send, to the server 370 and via the HFC network, a message indicating that the NFC signal was sent to the user device in the first time period in step S1218. In response to the step S1218, the server 370 may send, to the user device and via the cellular network, a message indicating that the NFC signal was sent for the user device 355 during the first time period (S1219). In step S1220, the user device 355 may monitor the NFC signal during a second time period. The user device 355 may determine the second time period based on the first time period and an NFC signal propagation time delay (e.g., the delay between the transmission from the NFC transmitter of the TS 320 and the reception by the user device 355). In step S1220, the user device 355 may determine whether the NFC signal is detected. Step S1121 may be as described in step S119 above.

Figure 13:
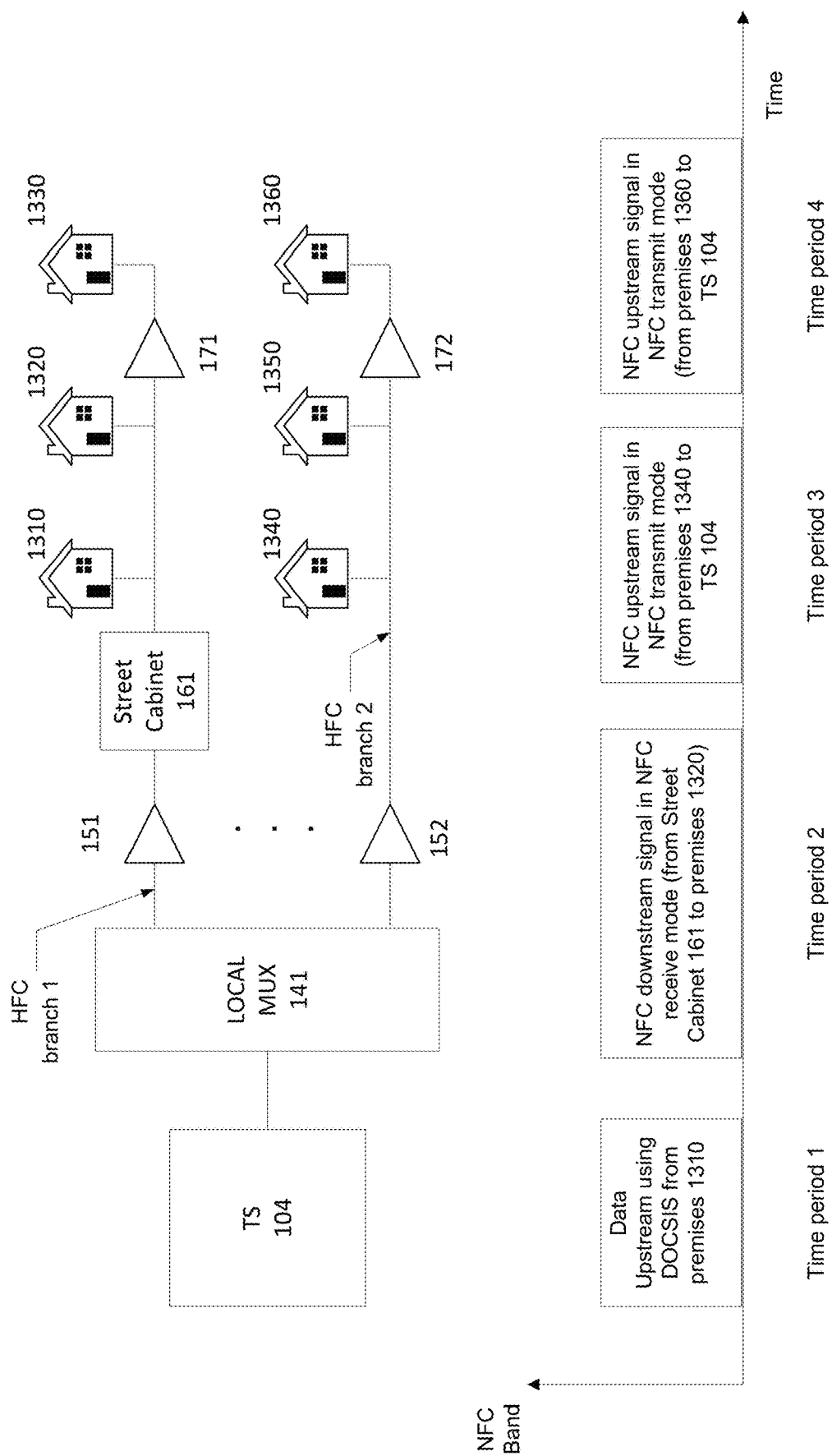
FIG. 13 shows an example of a frequency-time resource allocation in a DOCSIS upstream band.

FIG. 13 shows an example of a frequency-time resource allocation in a DOCSIS upstream band.

An NFC transmitter (or an NFC transceiver) controlled by the TS 320 may send a plurality of NFC downstream signals to a plurality of user devices via the HFC network. Further, cable upstream signals in accordance with the DOCSIS standards may be sent using the same 13.56 MHz band (the "NFC bands"). Thus, the TS 320 may schedule different time resources (e.g., timeslots) for various NFC signal transmissions by the NFC transmitter. For example, in step S1114, the server 370 may send, to the TS 320, a request for sending an NFC signal to the determined coaxial cable outlet in the first time period ("an NFC transmit timeslot") (e.g., from 13:50:02.00 to 13:50:12.00) scheduled by the server 370 or other scheduling devices. Various multiplexing schemes may be performed in generating a plurality of NFC signals to send the plurality of NFC signals in the same timeslot. For example, different modulation schemes, encoding schemes, or the like may be applied in generating the plurality of NFC signals.

As shown in FIG. 13, the local mux 141 may include a plurality of HFC branches including an HFC branch 1 and an HFC branch 2. The premises 1310, 1320, and 1330 are connected via the HFC branch 1, and the premises 1340, 1350, and 1360 are connected via the HFC branch 2. The NFC band may be shared by a plurality of network components and the premises in the plurality of HFC branches. For example, the server 370 or the TS 104 (e.g., the TS 320) may allocate different time periods (or timeslots) to different nodes in the HFC branches. As shown in the bottom of FIG. 13, a modem in the premises 1310 may send, to the TS 104 and via the HFC branch 1 using the DOCSIS upstream band including 13.56 MHz, a DOCSIS upstream signal in a time period 1. In a time period 2, an NFC transmitter in the street cabinet 161 may send, to the premises 1320, an NFC downstream signal in the NFC receive mode described above so that a mobile phone in the premises 1320 may receive the NFC signal via a coaxial cable outlet connected to the HFC branch 1. In a time period 3, a mobile phone in the premises 1340 may send, to the TS 104 and via the HFC branch 2, an NFC upstream signal in the NFC transmit mode described above. The local mux 141 and the coaxial network element 152 may transfer the NFC signal to the TS 104 so that a spectrum analyzer in the TS 104 may analyze the received signal (see e.g., FIG. 5) and determine whether the NFC signal from the premises 1340 has been detected. In a time period 4, a mobile phone in the premises 1360 may send, to the TS 104 and via the HFC branch 2, an NFC upstream signal in the NFC transmit mode described above. The local mux 141, the coaxial network element 152, and the coaxial network element 172 may transfer the NFC signal to the TS 104 so that the spectrum analyzer in the TS 104 may analyze the received signal (see e.g., FIG. 5) and determine whether the NFC signal from the premises 1360 has been detected.

The TS 320 or other network elements (e.g., an amplifier) in the HFC network may include or control a signal spectrum analyzer (e.g., a fast Fourier transform (FFT) spectrum analyzer) to analyze the NFC signal transmitted in the HFC network in the HFC network (e.g., at the TS 320 level). As shown in FIG. 5, the spectrum analyzer may detect signals in various frequency bands including the NFC band (e.g., around 13.56 MHz). A digital signal processor may execute one or more instructions, stored in memory implementing FFT algorithms, to generate a signal spectrum analysis result. Some passive network elements in the HFC network may be powered by receiving a transmitted NFC signal, and the powered passive network elements may perform one or more processes in the HFC network. For example, an HFC plant can energize, via an NFC signal propagating in the HFC network, the passive network equipment to participate in an inventory conversation.

Further, one or more band spectrum filters and band limited filters may be included in the HFC network. The TS 320 or other HFC network elements may control those filters to filter NFC signals propagating in the HFC network.

Figure 14:
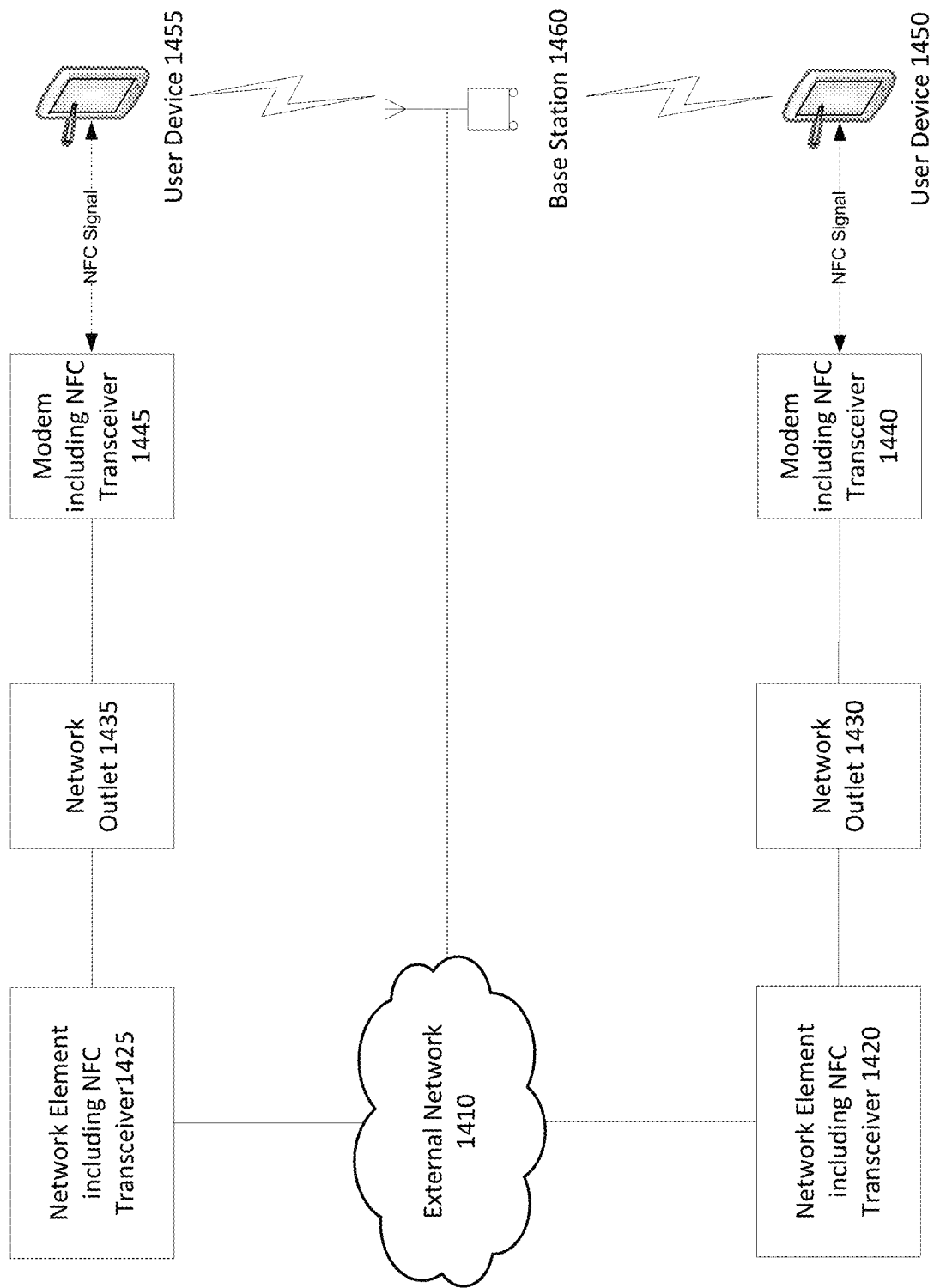
FIG. 14 shows an example diagram for communicating between user devices using an NFC communication over a coaxial cable network that can be used to implement any of the various features described herein.

FIG. 14 shows an example diagram for communicating between user devices using an NFC communication over a coaxial cable network that can be used to implement any of the various features described herein.

As shown in FIG. 14, a user device 1450 and a user device 1455 may communicate with each other using NFC signals via an HFC network. For example, the user device 1450 may communicate with an NFC transceiver included in a modem 1440 (e.g., a cable modem), and the user device 1455 may communicate with an NFC transceiver included in the modem 1445. The modem 1440 may be connected to a first portion of an HFC network via a network outlet 1430 (e.g., a coaxial cable outlet), and the modem 1445 may be connected to a second portion of the HFC network via a network outlet 1435 (e.g., a coaxial cable outlet). The modems 1440, 1445 may communicate with each other by sending and receiving cable signals in accordance with the DOCSIS standards or by sending and receiving NFC signals. As shown in FIG. 14, the first portion and the second portion of the HFC network may be connected with each other via an external network 1410. The communication between the user device 1450 and the user device 1455 via the HFC network enables an authentication process for the user devices 1450, 1455. For example, the user device 1455 may authenticate that the user device 1450 is located at the premises including the network outlet 1430, and the user device 1450 may authenticate that the user device 1455 is located at the premises including the network outlet 1435. Such an authentication process enables a secure transaction between the user devices 1450, 1455 for various purposes.

For example, the secure transactions may include money transfers, mobile payments via the NFC communication in the HFC network, etc. For example, mobile payments via the NFC communication in the HFC network may use an authentication process via an NFC signal transmission including a verification code.

A banking application may be downloaded on the user devices 1450, 1455 and the banking application may utilize the NFC communication in the HFC network. The user devices 1450, 1455 may have already configured a mobile payment setting that utilizes banking information and an NFC module equipped in the user devices 1450, 1455. The communication between the user device 1450 and the user device 1455 via an NFC signal transmission may utilize the preconfigured mobile payment setting. The user devices 1450, 1455 may communicate with each other, via the NFC communication in the HFC network, to play video games supporting the NFC communication or other application programs supporting the NFC communication. Via the HFC network, the user devices 1450, 1455 may share various type of files (e.g., electronic documents, music files, music streaming data, video streaming data, etc.) as well.

Figure 15:
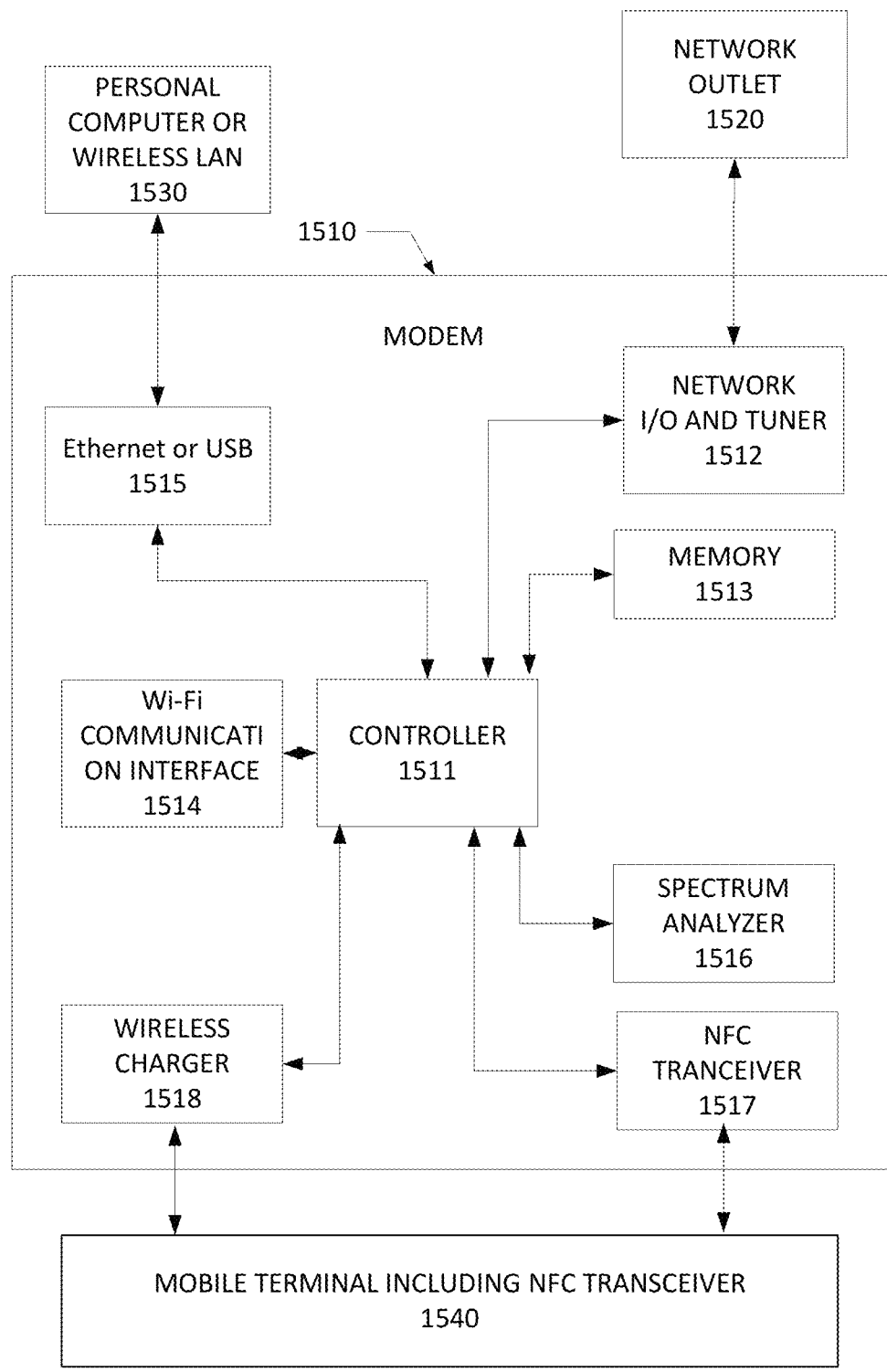
FIG. 15 shows an example cable modem that can be used to implement any of the various features described herein.

FIG. 15 shows an example cable modem that can be used to implement any of the various features described herein. One or more elements in the modem 1510 may be modified, omitted or added for various purposes. The modem 1510 includes a network input/output (I/O) and tuner 1512 so that the cable modem can send and receive a DOCSIS signal via a network outlet 1520 (e.g., a coaxial cable outlet) connected to the modem 1510. The network input/output (I/O) and tuner 1512 may include a demodulator (not shown) and/or a modulator (not shown). The demodulator may process an RF signal received from the network outlet 1520 and convert it into a signal that can be processed by an analog-to-digital (A/D) converter (not shown). The A/D converter takes the signal and turns it into a series of digital data.

The cable modem may include Ethernet and/or USB interface 1515 so that a personal computer or a wireless local area network (LAN) device 1530 can be connected to the modem 1510. The modem 1510 may include a Wi-Fi communication interface 1514 so that the cable modem may send and receive Wi-Fi signals.

The cable modem may include a spectrum analyzer 1516 (e.g., those similar to the spectrum analyzer controlled by the TS 320 described above). The spectrum analyzer may perform a signal spectrum analysis after receiving a signal from the network outlet 1520. The signal received from the network outlet 1520 may include an NFC signal, DOCSIS downstream signals, and noise signals. The mobile terminal 1540 may include an NFC transceiver and may communicate with the modem 1510 via the NFC transceiver 1517 for various purposes. The spectrum analysis result may be transferred to the mobile terminal 1540 by sending an NFC signal via the NFC transceiver 1517. The local spectrum analysis result may be reported back to the headend of the HFC network via a cellular signal of the mobile terminal 1540. The headend of the HFC network may receive a plurality of local spectrum analysis reports from various user devices (including e.g., the mobile terminal 1540).

The modem 1510 may include a wireless charger 1518 so that one or more batteries of the mobile terminal 1540 can be charged when the mobile terminal 1540 is placed in proximity to the modem 1510. For example, the modems 1440, 1445 (or a set-top box) may include an NFC antenna printed on the exterior housing of the modems 1440, 1445 so that a user device having an NFC transceiver may contact the exterior housing for an NFC communication. The wireless charger 1518 may be located in proximity to the NFC antenna printed on the exterior housing of the modems 1440, 1445 so that the NFC communication with the NFC transceiver 1517 and the wireless charging by the wireless charger 1518 may be performed simultaneously.

Memory 1513 may include one or more instructions and data utilized by the modem 1510. A controller 1511 of the modem 1510 may control one or more elements, modules, and/or devices in the modem 1510.

Figure 16A:
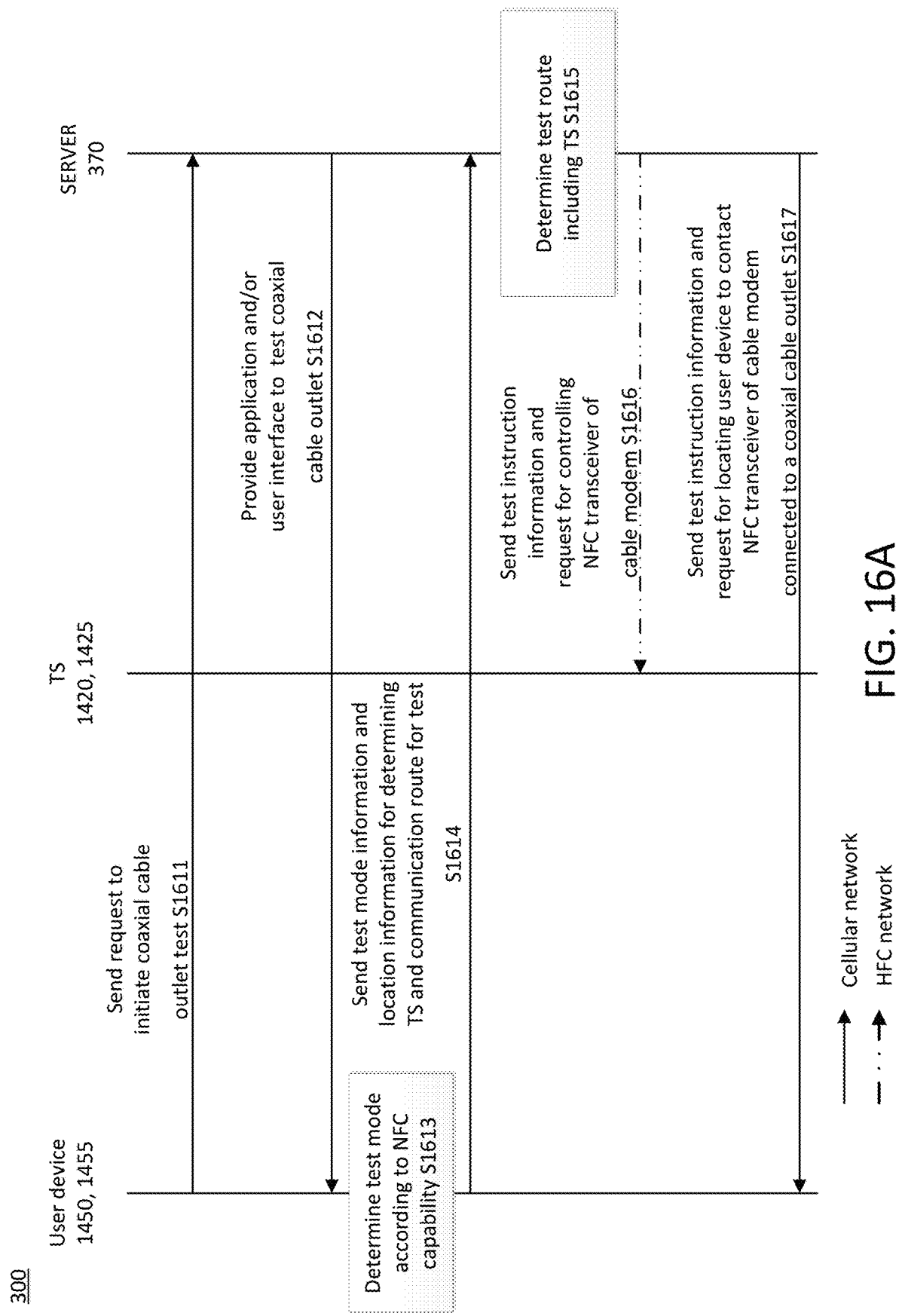
FIG. 16A shows an example of a message flow diagram for setting up a testing of a coaxial cable line connected to an NFC-enabled modem that can be used to implement any of the various features described herein.
Figure 16B:
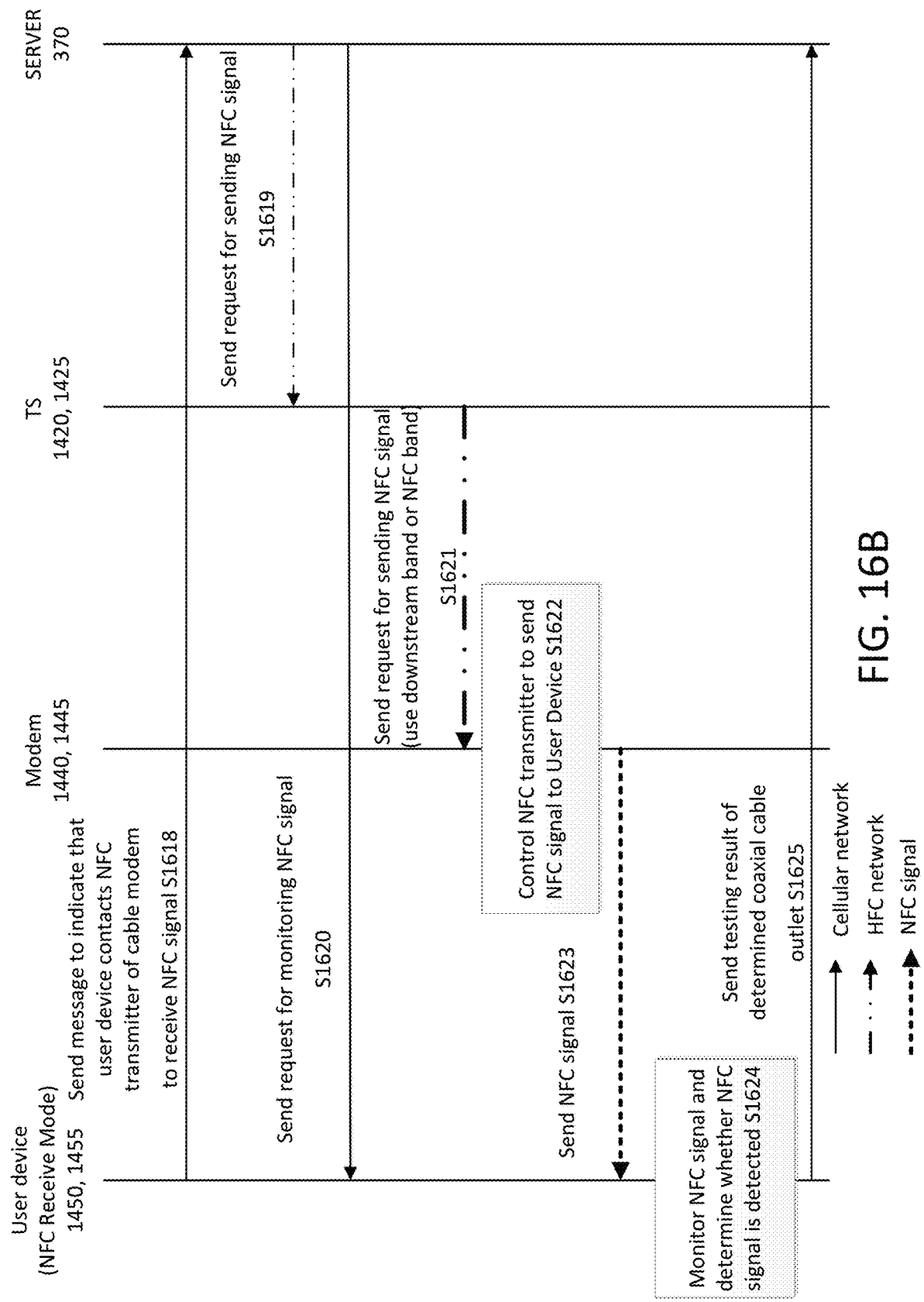
FIG. 16B shows an example of a message flow diagram for testing a coaxial cable line connected to an NFC-enabled modem that can be used to implement any of the various features described herein.

FIG. 16A shows an example of a message flow diagram for setting up a testing of a coaxial cable line connected to an NFC-enabled modem that can be used to implement any of the various features described herein. FIG. 16B shows an example of a message flow diagram for testing a coaxial cable line connected to an NFC-enabled modem that can be used to implement any of the various features described herein. Various features and steps shown in FIG. 16A are similar to those described above with respect to FIG. 6. Various features and steps shown in FIG. 16B are similar to those described above with respect to FIGS. 8A, 9, 10, 11, and 12. For a concise description, those similar features may not be described below. Steps S1611, S1612, S1613, S1614, and S1615 may be as described in step S611, S612, S613, S614, and S615 above, respectively.

As shown in e.g., FIG. 15, some cable modems may include an NFC transceiver. In step S1616, the server 370 may send, to the CMTS and via the HFC network, test instruction information and a request for controlling the NFC transceiver of the cable modem. In step S1617, the server 370 may send test instruction information and a request for locating the user device 1450, 1455 to contact the NFC transceiver of the modem 1440, 1445 connected to a respective coaxial cable outlet.

In step S1618, the user device 1450, 1455 may send, to the server 370 and via a cellular network, a message to indicate that the user device 1450, 1455 is contacting an NFC transmitter of the modem 1440, 1445 to receive an NFC signal. In step S1619, the server 370 may send, to the network elements 1420, 1425 (e.g., a TS, a CMTS, etc.) and via the HFC network, a request for sending an NFC signal. In step S1620, the server 370 may send, to the user device 1450, 1455 and via the cellular network, a request for monitoring the NFC signal.

In step S1621, the network elements 1420, 1425 may send a DOCSIS signal including a request for sending an NFC signal using a DOCSIS downstream band. Additionally or alternatively, the network elements 1420, 1425 may send an NFC signal including a request for sending an NFC signal using the NFC band. In response to the step S1621, the modem 1440, 1445 may control the NFC transmitter of the modem 1440, 1445 to generate an NFC signal (step S1622), and send the NFC signal to the user device 1450, 1455 (step S1623). Steps S1624 and S1625 may be as described in step S1118 and S1119 above, respectively.

The processes, methods, and configurations described herein can be used to address the costly cable line connectivity set-up and connectivity check processes. Further, the NFC communication signaling via the HFC network can also be used in a security setting that prevents wireless sniffers or hacking of the security system. The NFC communication signaling via the HFC network may also prevent recording of wireless signals from mobile devices.

As illustrated above, various aspects of the disclosure relate to providing an NFC communication via a coaxial cable network. In other implementations, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method comprising:
causing, by a computing device via a wireless communication connection, a mobile device to send a first wireless Near-Field Communication (NFC) signal for wireless reception by a first unused wire connector of one or more wired outlets;
determining, by the computing device, that the first wireless NFC signal from the mobile device was received via the first unused wire connector of the one or more wired outlets;
sending, by the computing device and to the mobile device, a first message indicating that the first wireless NFC signal from the mobile device was received via the first unused wire connector of the one or more wired outlets;
causing, by the computing device via the wireless communication connection, the mobile device to send a second wireless NFC signal for wireless reception by a second unused wire connector of the one or more wired outlets;
determining, by the computing device, that the second wireless NFC signal from the mobile device was not received; and
sending, by the computing device and to the mobile device, a second message indicating that the second wireless NFC signal from the mobile device was not received.

2. The method of claim 1, further comprising:
determining, based on a location of the mobile device, a location of the one or more wired outlets;
determining, based on the location of the one or more wired outlets, an NFC receiver of a wired network connected to the one or more wired outlets; and
receiving, from the NFC receiver, a third message indicating that the second wireless NFC signal from the mobile device was received by the NFC receiver via the first unused wire connector of the one or more wired outlets.

3. The method of claim 1, wherein at least one of the first message or the second message is sent via a cellular network, and wherein the wireless communication connection comprises a connection via the cellular network.

4. The method of claim 1, wherein the first unused wire connector is an unused coaxial cable connector serving as an NFC antenna.

5. The method of claim 1, further comprising causing the mobile device to receive, via the second unused wire connector of the one or more wired outlets, a third wireless NFC signal.

6. The method of claim 1, further comprising sending, to the mobile device, a message comprising a request to move the mobile device to a proximity of the second unused wire connector of the one or more wired outlets.

7. The method of claim 1, further comprising:
determining, based on a location of the one or more wired outlets, an NFC receiver connected to the one or more wired outlets via a coaxial cable; and
causing the NFC receiver to monitor for the first wireless NFC signal.

8. The method of claim 1, wherein the determining that the first wireless NFC signal was received comprises determining that the first wireless NFC signal was received by an NFC receiver connected to the one or more wired outlets.

9. The method of claim 1, wherein the first unused wire connector comprises an unconnected central conductor of an unused coaxial cable outlet.

10. The method of claim 1, wherein the computing device is located remotely from the mobile device and from the first unused wire connector of the one or more wired outlets.

11. An apparatus comprising:
one or more processors; and
memory storing instructions that, when executed by the one or more processors, cause the apparatus to:
cause, via a wireless communication connection, a mobile device to send a first wireless Near-Field Communication (NFC) signal for wireless reception by a first unused wire connector of one or more wired outlets;
determine that the first wireless NFC signal from the mobile device was received via the first unused wire connector of the one or more wired outlets;
send, to the mobile device, a first message indicating that the first wireless NFC signal from the mobile device was received via the first unused wire connector of the one or more wired outlets;
cause, via the wireless communication connection, the mobile device to send a second wireless NFC signal for wireless reception by a second unused wire connector of the one or more wired outlets;
determine that the second wireless NFC signal from the mobile device was not received; and
send, to the mobile device, a second message indicating that the second wireless NFC signal from the mobile device was not received.

12. The apparatus of claim 11, wherein the instructions, when executed by the one or more processors, cause the apparatus to:
determine, based on a location of the mobile device, a location of the one or more wired outlets;
determine, based on the location of the one or more wired outlets, an NFC receiver of a wired network connected to the one or more wired outlets; and
receive, from the NFC receiver, a third message indicating that the second wireless NFC signal from the mobile device was received by the NFC receiver via the first unused wire connector of the one or more wired outlets.

13. The apparatus of claim 11, wherein the instructions, when executed by the one or more processors, cause the apparatus to send at least one of the first message or second message via a cellular network, and wherein the wireless communication connection comprises a connection via the cellular network.

14. The apparatus of claim 11, wherein the first unused wire connector is an unused coaxial cable connector serving as an NFC antenna.

15. The apparatus of claim 11, wherein the instructions, when executed by the one or more processors, cause the apparatus to cause the mobile device to receive, via the second unused wire connector of the one or more wired outlets, a third wireless NFC signal.

16. The apparatus of claim 11, wherein the instructions, when executed by the one or more processors, cause the apparatus to send, to the mobile device, a message comprising a request to move the mobile device to a proximity of the second unused wire connector of the one or more wired outlets.

17. The apparatus of claim 11, wherein the instructions, when executed by the one or more processors, cause the apparatus to:
determine, based on a location of the one or more wired outlets, an NFC receiver connected to the one or more wired outlets via a coaxial cable; and
cause the NFC receiver to monitor for the first wireless NFC signal.

18. The apparatus of claim 11, wherein the instructions, when executed by the one or more processors, cause the apparatus to determine that the first wireless NFC signal was received by an NFC receiver connected to the one or more wired outlets.

19. The apparatus of claim 11, wherein the first unused wire connector comprises an unconnected central conductor of an unused coaxial cable outlet.

20. The apparatus of claim 11, wherein the apparatus is located remotely from the mobile device and from the first unused wire connector of the one or more wired outlets.

21. A system comprising:
a mobile device comprising a Near-Field Communication (NFC) transmitter; and
a computing device comprising:
one or more processors; and
memory storing instructions that, when executed by the one or more processors, cause the computing device to:
cause, via a wireless communication connection, the mobile device to send a first wireless NFC signal for wireless reception by a first unused wire connector of one or more wired outlets;
determine that the first wireless NFC signal from the mobile device was received via the first unused wire connector of the one or more wired outlets;
send, to the mobile device, a first message indicating that the first wireless NFC signal from the mobile device was received via the first unused wire connector of the one or more wired outlets;
cause, via the wireless communication connection, the mobile device to send a second wireless NFC signal for wireless reception by a second unused wire connector of the one or more wired outlets;
determine that the second wireless NFC signal from the mobile device was not received; and
send, to the mobile device, a second message indicating that the second wireless NFC signal from the mobile device was not received,
wherein the mobile device is configured to receive the first message.

22. The system of claim 21 wherein the instructions, when executed by the one or more processors, cause the computing device to:
determine, based on a location of the mobile device, a location of the one or more wired outlets;
determine, based on the location of the one or more wired outlets, an NFC receiver of a wired network connected to the one or more wired outlets; and
receive, from the NFC receiver, a third message indicating that the second wireless NFC signal from the mobile device was received by the NFC receiver via the first unused wire connector of the one or more wired outlets.

23. The system of claim 21, wherein the instructions, when executed by the one or more processors, cause the computing device to send at least one of the first message or second message via a cellular network, and wherein the wireless communication connection comprises a connection via the cellular network.

24. The system of claim 21, wherein the first unused wire connector is an unused coaxial cable connector serving as an NFC antenna.

25. The system of claim 21 wherein the instructions, when executed by the one or more processors, cause the computing device to cause the mobile device to receive, via the second unused wire connector of the one or more wired outlets, a third wireless NFC signal.

26. The system of claim 21 wherein the instructions, when executed by the one or more processors, cause the computing device to send, to the mobile device, a message comprising a request to move the mobile device to a proximity of the second unused wire connector of the one or more wired outlets.

27. The system of claim 21 wherein the instructions, when executed by the one or more processors, cause the computing device to:
determine, based on a location of the one or more wired outlets, an NFC receiver connected to the one or more wired outlets via a coaxial cable; and
cause the NFC receiver to monitor for the first wireless NFC signal.

28. The system of claim 21 wherein the instructions, when executed by the one or more processors, cause the computing device to determine that the first wireless NFC signal was received by an NFC receiver connected to the one or more wired outlets.

29. The system of claim 21, wherein the first unused wire connector comprises an unconnected central conductor of an unused coaxial cable outlet.

30. The system of claim 21, wherein the computing device is located remotely from the mobile device and from the first unused wire connector of the one or more wired outlets.

* * * * *

UNITED STATES PATENT AND TRADEMARK OFFICE
CERTIFICATE OF CORRECTION

| | |
|---|---|
| PATENT NO. | : 10,805,817 B2 |
| APPLICATION NO. | : 15/820877 |
| DATED | : October 13, 2020 |
| INVENTOR(S) | : Wolcott et al. |

It is certified that error appears in the above-identified patent and that said Letters Patent is hereby corrected as shown below:

In the Drawings

Sheet 3 of 23, Fig. 2, Reference Numeral 212, Line 2:
Please delete "TRANCEIVER" and insert --TRANSCEIVER--

In the Specification

Column 10, Detailed Description, Line 1:
Please delete "360" and insert --350--

Column 13, Detailed Description, Line 22:
Please delete "306," and insert --360,--

Column 17, Detailed Description, Line 57:
Please delete "305" and insert --350--

Column 21, Detailed Description, Line 28:
Please delete "S119" and insert --S1119--

Signed and Sealed this
Third Day of May, 2022

Katherine Kelly Vidal
*Director of the United States Patent and Trademark Office*